United States Patent
Manesh et al.

(10) Patent No.: US 9,662,939 B2
(45) Date of Patent: May 30, 2017

(54) TENSION-BASED NON-PNEUMATIC TIRE

(75) Inventors: Ali Manesh, Chicago, IL (US);
Michael John Tercha, Weston, WI (US); Brian Meliska, Weston, WI (US); Fidelis Ceranski, Marathon, WI (US); Glenn Howland, Kronenwetter, WI (US); Louie Stark, Mosinee, WI (US); Karen Hauch, Wausau, WI (US); Todd Petersen, Ringle, WI (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 349 days.

(21) Appl. No.: 12/510,833

(22) Filed: Jul. 28, 2009

(65) Prior Publication Data

US 2011/0024008 A1 Feb. 3, 2011

(51) Int. Cl.
| | | |
|---|---|---|
| B60C 7/00 | (2006.01) | |
| B60B 9/00 | (2006.01) | |
| B60C 7/18 | (2006.01) | |
| B29D 30/02 | (2006.01) | |
| B60B 19/00 | (2006.01) | |

(Continued)

(52) U.S. Cl.
CPC ............... *B60C 7/18* (2013.01); *B29D 30/02* (2013.01); *B60B 19/00* (2013.01); *B60C 7/12* (2013.01); *B60C 7/22* (2013.01); *B60B 2310/204* (2013.01); *B60B 2310/318* (2013.01); *B60B 2310/321* (2013.01); *B60B 2310/56* (2013.01); *B60B 2360/102* (2013.01); *B60B 2360/32* (2013.01); *B60B 2360/324* (2013.01); *B60B 2360/3416* (2013.01);

(Continued)

(58) Field of Classification Search
CPC ....... B60C 7/00; B60C 7/10; B60C 2007/107; B60C 2007/146; B60C 7/14; B60C 7/18; B60C 7/28; B60B 9/00; B60B 9/02; B60B 9/10; B60B 9/26
USPC ......... 152/5, 7, 11, 246, 300–301, 323–329; 267/279, 281–282, 292, 141, 267/141.6–141.7, 144, 147, 181; 248/615, 632–634, 638
See application file for complete search history.

(56) References Cited

U.S. PATENT DOCUMENTS

| | | | |
|---|---|---|---|
| 576,072 A | 1/1897 | Humbrecht | |
| 637,200 A | 11/1899 | Finin | |

(Continued)

FOREIGN PATENT DOCUMENTS

| | | |
|---|---|---|
| BE | 367854 A | 2/1930 |
| CN | 86106585 A | 7/1987 |

(Continued)

OTHER PUBLICATIONS

Chinese Office Action for Chinese Application No. 200880010003. 6, dated Dec. 29, 2010, in 13 pages.

(Continued)

*Primary Examiner* — Jason Bellinger
(74) *Attorney, Agent, or Firm* — Bridgestone Americas Tire Operations, LLC

(57) ABSTRACT

A non-pneumatic tire for supporting a load by working in tension. The tire can comprise a generally annular inner ring, a generally annular outer ring, and a web having a plurality of web elements. The tire can further comprise a layer or layers fabric material acting as a bonding agent to bond tire components together.

20 Claims, 14 Drawing Sheets

(51) Int. Cl.
    *B60C 7/12*     (2006.01)
    *B60C 7/22*     (2006.01)

(52) U.S. Cl.
    CPC ... *B60B 2360/3418* (2013.01); *B60B 2360/50* (2013.01); *B60B 2900/131* (2013.01)

(56) References Cited

U.S. PATENT DOCUMENTS

| | | |
|---|---|---|
| 654,897 A | 7/1900 | Keller |
| 748,797 A | 1/1904 | Schwieger |
| 798,185 A | 8/1905 | Irwin |
| 818,568 A | 4/1906 | Sims |
| 820,077 A | 5/1906 | Whiteley |
| 856,957 A | 6/1907 | Hubbard |
| 906,804 A | 12/1908 | Kempshall |
| 927,154 A | 7/1909 | Martin |
| 987,340 A | 3/1911 | Besler |
| 1,041,829 A | 10/1912 | Mallory |
| 1,042,035 A | 10/1912 | Ray |
| 1,057,734 A | 4/1913 | Harrison |
| 1,060,480 A | 4/1913 | Minnick |
| 1,066,267 A | 7/1913 | Gerleit |
| 1,085,700 A | 2/1914 | Percy |
| 1,106,238 A | 8/1914 | Papadopoulos |
| 1,136,546 A | 4/1915 | Markson |
| 1,146,654 A | 7/1915 | Rietschel |
| 1,154,504 A | 9/1915 | Gano |
| 1,156,311 A | 10/1915 | Rabey |
| 1,190,874 A | 7/1916 | Durfee |
| 1,232,127 A | 7/1917 | Uhrinecz |
| 1,242,269 A | 10/1917 | Teeple |
| 1,244,276 A | 10/1917 | Anglemyer |
| 1,252,736 A | 1/1918 | Szakacs |
| 1,262,501 A | 4/1918 | Huetter |
| 1,262,550 A | 4/1918 | Northern |
| 1,282,690 A | 10/1918 | Hamlin |
| 1,286,634 A | 12/1918 | Holland |
| 1,287,255 A | 12/1918 | De Carmona |
| 1,292,729 A | 1/1919 | Drach |
| 1,300,933 A | 4/1919 | Divers |
| 1,365,181 A | 1/1921 | Marzak et al. |
| 1,451,517 A | 4/1923 | Smith |
| 1,461,928 A | 7/1923 | Miller |
| 1,557,437 A | 10/1925 | Dodge |
| 1,640,613 A | 8/1927 | Miller |
| 1,660,845 A | 2/1928 | Mamessier |
| 1,710,524 A | 4/1929 | Vitenko |
| 1,753,735 A | 4/1930 | Athey |
| 1,948,412 A | 2/1934 | Bennett |
| 2,055,461 A | 9/1936 | Baddock |
| 2,235,378 A | 3/1941 | Martin |
| 2,283,274 A | 5/1942 | Martin |
| 2,298,142 A | 10/1942 | Martin |
| 2,331,212 A | 10/1943 | Martin |
| 2,341,721 A | 2/1944 | Kapp |
| 2,620,844 A | 12/1952 | Lord |
| 2,701,431 A | 2/1955 | Whitesell |
| 2,742,941 A | 4/1956 | Johnson |
| 2,912,032 A | 11/1959 | Alexander |
| 3,182,705 A | 5/1965 | Markow |
| 3,188,775 A | 6/1965 | Cosmos |
| 3,219,090 A | 11/1965 | Cislo |
| 3,237,667 A | 3/1966 | Lindley |
| 3,311,149 A | 3/1967 | Mathiesen |
| 3,380,779 A | 4/1968 | Albright |
| 3,465,804 A | 9/1969 | Dupre |
| 3,493,027 A | 2/1970 | Dewhirst et al. |
| 3,635,273 A | 1/1972 | Patecell |
| 4,111,249 A | 9/1978 | Markow |
| 4,153,095 A | 5/1979 | Sarkissian |
| 4,169,494 A | 10/1979 | Kubica et al. |
| 4,226,273 A | 10/1980 | Long et al. |
| 4,235,270 A | 11/1980 | Kahaner et al. |
| 4,287,927 A | 9/1981 | Caravito et al. |
| 4,350,196 A | 9/1982 | Hampshire |
| 4,366,015 A | 12/1982 | Murray |
| 4,459,167 A | 7/1984 | Markow et al. |
| 4,549,592 A | 10/1985 | Schroder |
| 4,553,577 A | 11/1985 | Gregg |
| 4,558,727 A | 12/1985 | Golata et al. |
| 4,673,014 A | 6/1987 | Markow |
| 4,749,345 A | 6/1988 | Warmuth et al. |
| 4,769,416 A | 9/1988 | Gelling et al. |
| 4,832,098 A | 5/1989 | Palinkas et al. |
| 4,894,281 A | 1/1990 | Yagi et al. |
| 4,917,162 A | 4/1990 | De Longcamp |
| 4,921,029 A | 5/1990 | Palinkas et al. |
| 4,934,425 A | 6/1990 | Gajewski et al. |
| 4,945,962 A | 8/1990 | Pajtas |
| 5,023,040 A | 6/1991 | Gajewski et al. |
| 5,042,544 A | 8/1991 | Dehasse |
| 5,050,656 A | 9/1991 | Ho |
| 5,086,815 A | 2/1992 | Panaroni |
| 5,139,066 A | 8/1992 | Jarman |
| 5,168,910 A | 12/1992 | Zhang et al. |
| 5,174,634 A | 12/1992 | Blanck |
| 5,223,599 A | 6/1993 | Gajewski |
| 5,236,027 A | 8/1993 | Lu |
| 5,265,659 A | 11/1993 | Pajtas et al. |
| 5,343,916 A | 9/1994 | Duddey et al. |
| 5,353,853 A | 10/1994 | Hanson |
| 5,460,213 A | 10/1995 | Pajtas |
| 5,494,090 A | 2/1996 | Kejha |
| 5,535,800 A | 7/1996 | Abbott |
| 5,743,316 A | 4/1998 | Chrobak |
| 5,961,760 A | 10/1999 | Tajima et al. |
| 6,170,544 B1 | 1/2001 | Hottebart |
| 6,187,245 B1 | 2/2001 | Hedley |
| 6,279,630 B1 | 8/2001 | Ims |
| 6,298,891 B1 | 10/2001 | Harris |
| 6,364,424 B1 | 4/2002 | Lashlee et al. |
| 6,374,887 B1 | 4/2002 | Subotics |
| 6,394,407 B1 | 5/2002 | Ryaboy |
| 6,431,235 B1 | 8/2002 | Steinke |
| 6,450,222 B1 | 9/2002 | Fleming |
| 6,467,519 B1 | 10/2002 | Owen |
| 6,564,842 B2 | 5/2003 | Drieux et al. |
| 6,568,443 B2 | 5/2003 | Shoner |
| 6,615,885 B1 | 9/2003 | Ohm |
| 6,640,859 B1 | 11/2003 | Laurent et al. |
| 6,648,039 B1 | 11/2003 | Bina |
| 6,679,012 B1 | 1/2004 | Chen et al. |
| 6,681,822 B2 | 1/2004 | Adams et al. |
| 6,698,480 B1 | 3/2004 | Cornellier |
| 6,769,465 B2 | 8/2004 | Rhyne et al. |
| 6,789,810 B2 | 9/2004 | Strong |
| 6,983,776 B2 | 1/2006 | Thompson et al. |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,143,797 B2 | 12/2006 | Vannan |
| 7,174,936 B2 | 2/2007 | Becker et al. |
| 7,201,194 B2 | 4/2007 | Rhyne et al. |
| 7,418,988 B2 | 9/2008 | Cron et al. |
| 7,650,919 B2 | 1/2010 | Rhyne et al. |
| 8,104,524 B2 | 1/2012 | Manesh et al. |
| 8,109,308 B2 | 2/2012 | Manesh et al. |
| 8,176,957 B2 | 5/2012 | Manesh et al. |
| 2002/0096237 A1 | 7/2002 | Burhoe et al. |
| 2003/0229326 A1 | 12/2003 | Hovis et al. |
| 2004/0012246 A1 | 1/2004 | Rhyne et al. |
| 2004/0203304 A1 | 10/2004 | Almonacil et al. |
| 2005/0014437 A1 | 1/2005 | Yoshida |
| 2005/0076983 A1 | 4/2005 | Kimura et al. |
| 2006/0021257 A1 | 2/2006 | Hung |
| 2006/0113016 A1 | 6/2006 | Cron |
| 2006/0174989 A1 | 8/2006 | Jones |
| 2007/0215259 A1 | 9/2007 | Burns |
| 2007/0267116 A1 | 11/2007 | Rhyne et al. |
| 2008/0045643 A1 | 2/2008 | Henning et al. |
| 2008/0053586 A1 | 3/2008 | Hanada et al. |
| 2008/0073014 A1 | 3/2008 | Abe |
| 2008/0149247 A1 | 6/2008 | Heuze et al. |

(56) References Cited

U.S. PATENT DOCUMENTS

| | | |
|---|---|---|
| 2008/0169638 A1 | 7/2008 | Beyer-Meklenburg et al. |
| 2008/0220675 A1 | 9/2008 | Ikeno et al. |
| 2008/0314486 A1 | 12/2008 | Manesh et al. |
| 2009/0107596 A1 | 4/2009 | Palinkas et al. |
| 2009/0173421 A1 | 7/2009 | Love et al. |
| 2009/0211674 A1 | 8/2009 | Hanada et al. |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0283185 A1 | 11/2009 | Manesh et al. |
| 2009/0301625 A1 | 12/2009 | Moon et al. |
| 2010/0078111 A1 | 4/2010 | Anderson et al. |
| 2010/0132858 A1 | 6/2010 | Arakawa et al. |
| 2010/0132865 A1 | 6/2010 | Iwase et al. |
| 2010/0200131 A1 | 8/2010 | Iwase et al. |
| 2010/0314014 A1 | 12/2010 | Burns |
| 2011/0011506 A1 | 1/2011 | Manesh et al. |
| 2011/0030866 A1 | 2/2011 | Fadel et al. |
| 2011/0079335 A1 | 4/2011 | Manesh et al. |
| 2011/0180194 A1 | 7/2011 | Anderson et al. |
| 2011/0240193 A1 | 10/2011 | Matsuda |
| 2012/0234444 A1 | 9/2012 | Palinkas et al. |
| 2012/0241062 A1 | 9/2012 | Manesh et al. |
| 2012/0247635 A1 | 10/2012 | Manesh et al. |
| 2012/0318421 A1 | 12/2012 | Matsuda et al. |

FOREIGN PATENT DOCUMENTS

| | | |
|---|---|---|
| CN | 1154582 | 6/2004 |
| CN | 101687433 | 3/2010 |
| DE | 2718374 A1 | 11/1977 |
| DE | 4428516 A1 | 2/1996 |
| DE | 102006037666 | 2/2008 |
| EP | 0159888 | 10/1985 |
| EP | 0353006 A2 | 1/1990 |
| EP | 0 159 888 B1 | 3/1991 |
| EP | 0561222 A1 | 9/1993 |
| EP | 0401564 B1 | 3/1994 |
| EP | 0802865 B1 | 10/1997 |
| EP | 1123817 A2 | 8/2001 |
| EP | 1902866 A1 | 3/2008 |
| EP | 1980420 | 10/2008 |
| FR | 2893274 A1 | 5/2007 |
| GB | 2305404 A | 4/1997 |
| JP | 1-311902 | 12/1989 |
| JP | 01314602 A | 12/1989 |
| JP | 01314603 A | 12/1989 |
| JP | 2179503 | 7/1990 |
| JP | 03025004 A | 2/1991 |
| JP | 3189202 | 8/1991 |
| JP | 03248901 A | 11/1991 |
| JP | H05213010 | 8/1993 |
| JP | 06-109050 | 4/1994 |
| JP | 2007112243 | 5/2007 |
| JP | 2008049943 | 3/2008 |
| JP | 2008132951 | 6/2008 |
| JP | 2008162495 | 7/2008 |
| JP | 2008222038 | 9/2008 |
| JP | 2009035050 | * 2/2009 ............ 152/11 |
| JP | 2009-269413 | 11/2009 |
| JP | 2010137648 | 6/2010 |
| NL | 6609460 A | 1/1967 |
| NL | 7006625 A | 11/1970 |
| NO | 864021 A | 10/1986 |
| WO | WO 03/018332 | 3/2003 |
| WO | WO 2006/116807 | 11/2006 |
| WO | WO 2007/057975 | 5/2007 |
| WO | WO 2008/050503 | 5/2008 |
| WO | WO 2008/118983 A1 | 10/2008 |
| WO | WO 2009/135561 A2 | 11/2009 |

OTHER PUBLICATIONS

International Search Report for International Application No. PCT/US2010/042613, dated Mar. 2, 2011, in 4 pages.

Written Opinion for International Application No. PCT/US2010/042613, dated Mar. 2, 2011, in 5 pages.

Chinese Notification of Decision of Rejection for Application No. 200880010003.6, dated Jun. 17, 2011, 15 pages.

International Search Report for Application No. PCT/US08/58308, dated Aug. 7, 2008, in 2 pages.

International Search Report for Application No. PCT/US2009/058652, dated Nov. 17, 2009, in 2 pages.

Written Opinion of the International Searching Authority for Application No. PCT/US08/58308, dated Aug. 7, 2008, in 7 pages.

Written Opinion of the International Searching Authority for Application No. PCT/US2009/058652, dated Nov. 17, 2009, in 6 pages.

International Search Report issued by the European Patent Office, for International Application No. PCT/US2013/031153, dated Aug. 29, 2013; 7 pages.

Written Opinion issued by the European Patent Office for International Application No. PCT/US2013/031153, dated Aug. 29, 2013; 10 pages.

International Preliminary Report on Patentability issued by the International Bureau of WIPO, Geneva, Switzerland, for International Application No. PCT/US2008/058308, dated Sep. 29, 2009; 6 pages.

International Preliminary Report on Patentability issued by the International Bureau of WIPO, Geneva, Switzerland, for International Application No. PCT/US2009/058652, dated Mar. 29, 2011; 7 pages.

International Preliminary Report on Patentability issued by the International Bureau of WIPO, Geneva, Switzerland, for International Application No. PCT/US2010/042613, dated Jan. 24, 2012; 6 pages.

* cited by examiner

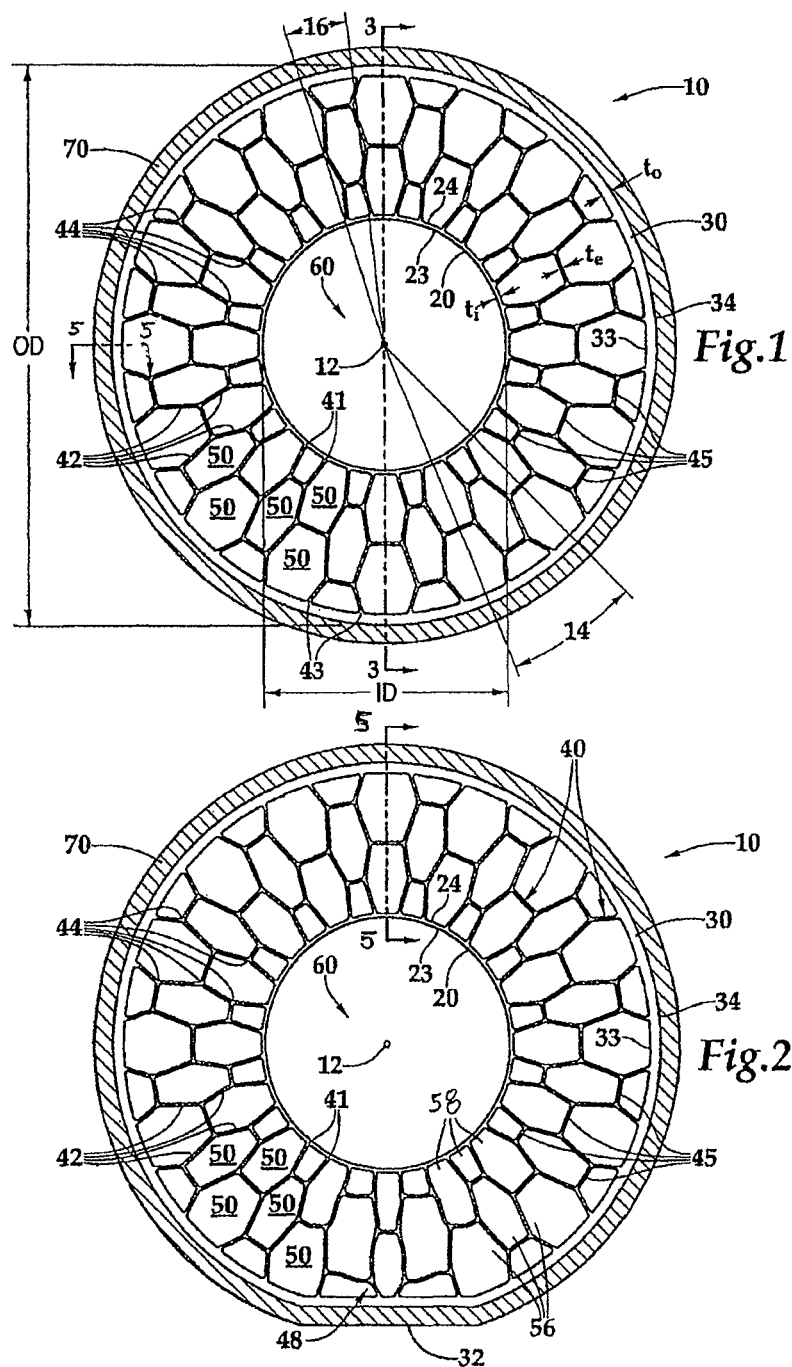

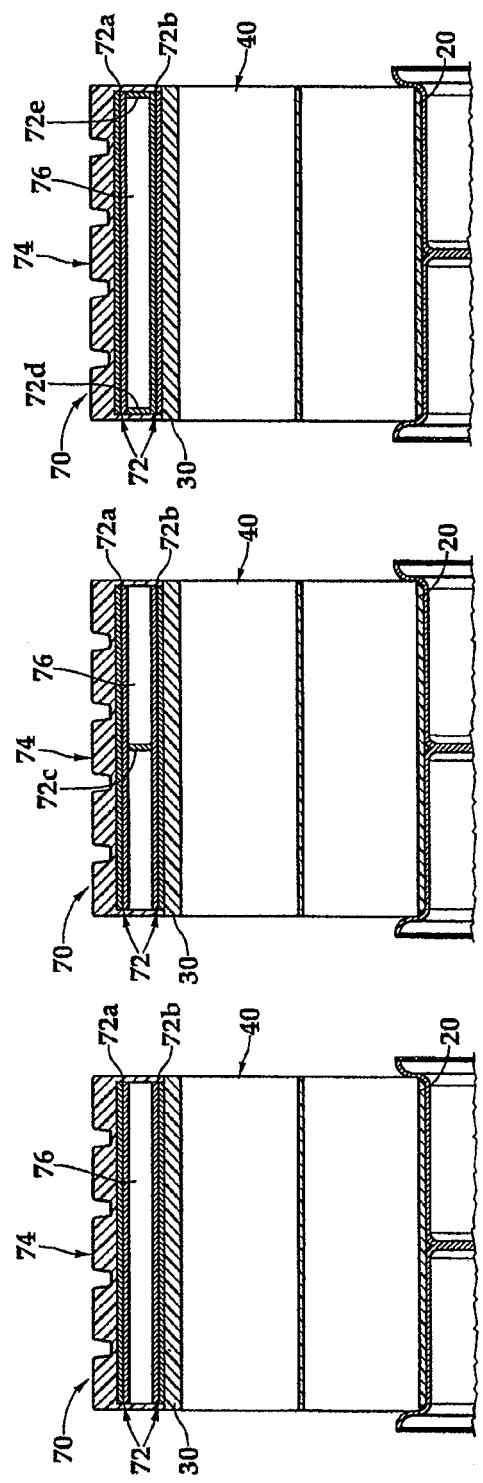

TENSION-BASED NON-PNEUMATIC TIRE

This invention was made, in part, with United States government support awarded by the United States Army Research Laboratory under contract numbers W911NF-06-2-0021 and W911QX-08-C-0034. Accordingly, the United States may have certain rights in this invention.

BACKGROUND OF THE INVENTION

Field of the Invention

The present application is directed to a tire, and more particularly, to a non-pneumatic tire.

Description of the Related Art

Non-pneumatic, or airless, tires (NPT) have historically been comprised largely of an entirely solid substance. These solid tires made the ride rather uncomfortable for passengers and caused greater damage to the suspension of a vehicle, which had to compensate for the lack of "give" in a solid tire. Eventually, it was found that putting pressurized air in tires created a more comfortable ride. However, along with their advantages, pneumatic tires still possess some drawbacks.

The material that encloses standard pneumatic tires is susceptible to leaking the pressurized air it tries to withhold. This occurs both via leakage around the wheel rim, and on a smaller scale, when the rubber of the tire absorbs the oxygen. As a result, loss of pressure causes the tire to flatten in the area where the load is applied, subjecting a larger portion of the tire to the load with every revolution, and leading to quicker degradation of the tire. Furthermore, a tire reliant upon pressurized air is susceptible to being punctured leading to rapid release of the pressurized air.

Focusing on fuel efficiency, safety and ride comfort, several attempts have been made to address the problems associated with pneumatic tires while retaining their advantages over solid non-pneumatic tires. By way of example, U.S. Published Application 2006/0113016 by Cron, et al., and assigned to Michelin, discloses a non-pneumatic tire that it commercially refers to as the Tweel™. In the Tweel™, the tire combines with the wheel. It is made up of four parts that are eventually bonded together: the wheel, a spoke section, a reinforced annular band that surrounds the spoke section, and a rubber tread portion that contacts the ground.

Other alternatives to standard pneumatic tires have been attempted, including making solid tires out of polyurethane instead of rubber and suspending reinforcement materials within the polyurethane during molding. Another alternative is to use internal ribs made of a thermoplastic that are subsequently reinforced with glass fibers. A third alternative is to use an electroactive polymer that is capable of changing shape when an electrical current is applied. This allows the tire to change shape or size based upon road conditions by using the automobile's electrical system.

SUMMARY OF THE INVENTION

In accordance with at least one embodiment disclosed herein, a novel non-pneumatic tire for supporting an applied load is provided, the tire having an inner ring that attaches to a wheel having an axis of rotation, an outer ring, and a web between the inner ring and outer ring. The web can be made of a material that is relatively stronger in tension than in compression such that the portion of the web between the wheel and a footprint region can either buckle or be subject to a significantly smaller portion of the load, if any, while the rest of the load can be distributed through the remaining portion of the web. In one embodiment, the web can attach directly to the wheel or tread carrying layer.

The web can be one of multiple possible forms. In one embodiment, the elements of the web interconnect to form multiple layers of interfitting generally polygonal openings such that there are at least two adjacent layers of openings spaced at different radial distances from each other when viewed at any radial slice of the web. The openings of one layer can be similarly shaped compared to the openings of at least one other layer, but they can also be shaped differently. In addition, the openings of one layer can be similarly shaped to the other openings in that same layer. Furthermore, while the openings of one layer can be similarly shaped to the openings of another layer, they can be sized differently, such that the openings of a radially outer layer can be larger or smaller than the openings of a comparatively radially inner layer. In another embodiment, the openings of one layer are not similarly shaped to the openings in that same layer.

A tread carrying layer in the outer ring can comprise reinforcing belts and a layer of support material, which act as a shear layer. As a footprint is formed by the tire, the support material between the reinforcing belts is subjected to a shear force. Thus, the support layer provides the tread carrying layer with increased stiffness.

In accordance with another embodiment disclosed herein, a non-pneumatic tire is provided comprising a generally annular inner ring having an axis of rotation, a deformable generally annular outer ring, and a flexible web, the outer ring and/or flexible web comprised of a first flowable material. The web can comprise tension members. The non-pneumatic tire can further comprise a tread carrying layer affixed to a radially external surface of the outer ring, the tread carrying layer comprised of a second flowable material. The annular outer ring and the tread carrying layer can be bonded together with a layer of fabric material.

For example, in accordance with one embodiment, a method of forming a composite structure within a tire can comprise providing a first flowable material in a solid state, placing a fabric material along a radially inwardly facing surface of the first flowable material, and overmolding a second flowable material directly onto the radially inwardly facing surface of the first flowable material, such that the fabric material acts as a bonding agent between the first flowable material and the second flowable material.

In accordance with yet another embodiment disclosed herein, a non-pneumatic tire for supporting an applied load is provided, the tire having a generally cylindrical component which fastens to an existing wheel's components. An interconnected web and generally radial outer surface, including a tread layer, can be molded onto the cylindrical component, such that the cylindrical component, web, and generally radial outer surface can easily be removed from the tire's wheel components for replacement or servicing.

In accordance with yet another embodiment disclosed herein, a non-pneumatic tire for supporting an applied load is provided, the tire having a generally cylindrical component which attaches to a single wheel plate. An interconnected web and generally radial outer surface, including a tread layer, can be molded onto the cylindrical component, such that the cylindrical component, web, and generally radial outer surface can easily be removed from the tire's wheel plate for replacement or servicing.

In accordance with yet another embodiment disclosed herein, a non-pneumatic tire for supporting an applied load is provided, the tire having a sidewall directly attached or integrally formed with an interconnected web. The sidewall can have a lower stiffness than that of the interconnected web elements so that the interconnected web supports the majority of the tire's load. The sidewall can flex, or bend in those spaces between the interconnected web elements.

In accordance with yet another embodiment disclosed herein, a non-pneumatic tire for supporting an applied load is provided, the tire having a sidewall only partially attached or integrally formed with an interconnected web. The sidewall can have a lower stiffness than that of the interconnected web elements, and can be free to flex in those areas where it is not attached to the interconnected web elements.

In accordance with yet another embodiment disclosed herein, a non-pneumatic tire for supporting an applied load is provided, the tire having a sidewall partially attached or integrally formed with an interconnected web. The sidewall can have "domed" or flexed shape which facilitates and biases bending or flexing of the sidewall in a prescribed direction away from the tire.

BRIEF DESCRIPTION OF THE DRAWINGS

These and other features of the present embodiments will become more apparent upon reading the following detailed description and with reference to the accompanying drawings of the embodiments, in which:

FIG. 1 is a front view of an undeformed non-pneumatic tire.

FIG. 2 is a front view of the non-pneumatic tire of FIG. 1 being deformed when subjected to a load.

FIG. 5 is a sectional view of a prior art tread carrying layer attached to a non-pneumatic tire taken along line 5-5 in FIG. 2.

FIG. 6 is a sectional view of another tread carrying layer attached to a non-pneumatic tire taken along line 5-5 in FIG. 2.

FIG. 7 is a sectional view of still another tread carrying layer attached to a non-pneumatic tire taken along line 5-5 in FIG. 2.

DETAILED DESCRIPTION OF THE PREFERRED EMBODIMENTS

Figure 3:
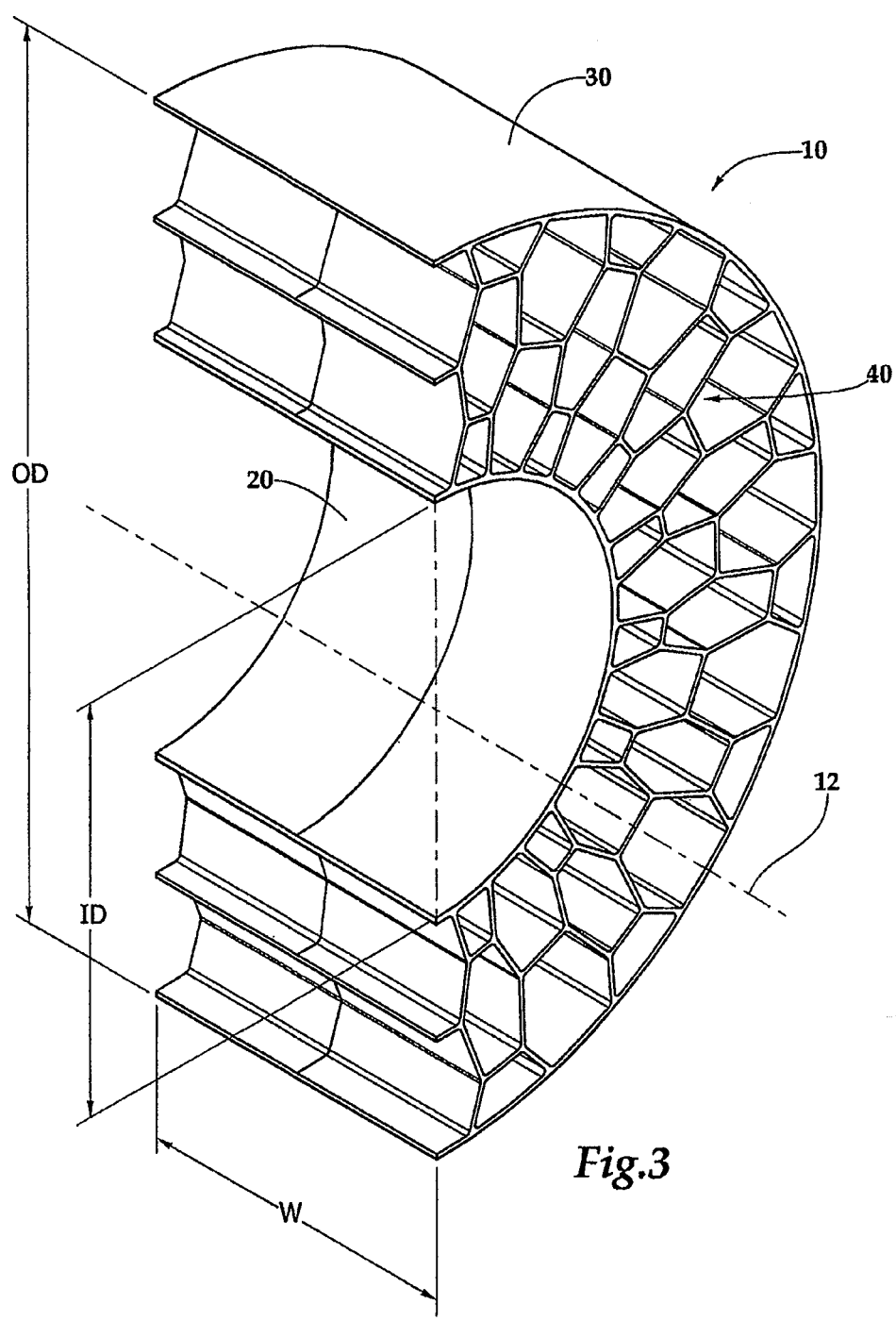
FIG. 3 is a sectional perspective view of the undeformed non-pneumatic tire taken along line 3-3 in FIG. 1.

FIGS. 1, 2 and 3 illustrate an embodiment of a non-pneumatic tire 10 having certain features and advantages according to an embodiment of the present invention. In the illustrated embodiment, the non-pneumatic tire 10 comprises a generally annular inner ring 20 that engages a wheel 60 to which tire 10 is mounted. The wheel 60 has an axis of rotation 12 about which tire 10 spins. The generally annular inner ring 20 comprises an internal surface 23 and an external surface 24 and can be made of cross-linked or uncross-linked polymers. In one embodiment, the generally annular inner ring 20 can be made of a thermoplastic material such as a thermoplastic elastomer, a thermoplastic urethane or a thermoplastic vulcanizate. In another embodiment, the generally annular inner ring 20 can be made of rubber, polyurethane, and/or other suitable material. In this application, the term "polymer" means cross-linked or uncross-linked polymers.

For smaller applied loads, L, the generally annular inner ring 20 can be adhesively engaged with wheel 60 or can undergo some chemical structure change allowing it to bond to the wheel 60. For larger applied loads, L, the generally annular inner ring 20 can be engaged to the wheel 60 via some form of a mechanical connection such as a mating fit, although a mechanical connection can be used for supporting smaller loads as well. The mechanical engagement can provide both the wheel 60 and the generally annular inner ring 20 with extra strength to support the larger applied load, L. In addition, a mechanical connection has the added benefit of ease of interchangeability. For example, if the non-pneumatic tire 10 needs to be replaced, generally annular inner ring 20 can be detached from wheel 60 and replaced. The wheel 60 can then be remounted to the axle of the vehicle, allowing the wheel 60 to be reusable. In another embodiment, the inner ring 20 can be connected to the wheel 60 by a combination of a mechanical and adhesive connection.

With continued reference to FIGS. 1, 2 and 3, the non-pneumatic tire 10 further comprises a generally annular outer ring 30 surrounding an interconnected web 40 (discussed below). The outer ring 30 can be configured to deform in an area around and including a footprint region 32 (see FIG. 2), which decreases vibration and increases ride comfort. However, since in some embodiments the non-pneumatic tire 10 does not have a sidewall, the generally annular outer ring 30, combined with the interconnected web 40, can also add lateral stiffness to the tire 10 so that the tire 10 does not unacceptably deform in portions away from the footprint region 32.

In one embodiment, the generally annular inner ring 20 and a generally annular outer ring 30 are made of the same material as interconnected web 40. For example, in one embodiment the inner ring, outer ring, and interconnected web are all comprised of a urethane material. The generally annular inner ring 20 and the generally annular outer ring 30 and the interconnected web 40 can be made by injection or compression molding, castable polymer, or any other method generally known in the art and can be formed at the same time so that their attachment is formed by the material comprising the inner ring 20, the outer ring 30 and the interconnected web 40 cooling and setting.

As shown in FIGS. 1, 2 and 3, the interconnected web 40 of non-pneumatic tire 10 connects the generally annular inner ring 20 to the generally annular outer ring 30. In the illustrated embodiment, the interconnected web 40 comprises at least two radially adjacent layers 56, 58 of web elements 42 that define a plurality of generally polygonal openings 50. In other words, with at least two adjacent layers 56, 58, a slice through any radial portion of the non-pneumatic tire 10 extending from the axis of the rotation 12 to the generally annular outer ring 30 passes through or traverses at least two generally polygonal openings 50. The polygonal openings 50 can form various shapes. In many embodiments, a majority of generally polygonal openings 50 can be generally hexagonal shape with six sides. However, it is possible that each one of the plurality of generally polygonal openings 50 has at least three sides. In one embodiment, the plurality of generally polygonal openings 50 are either generally hexagonal in shape or hexagonal in shape circumferentially separated by openings that are generally trapezoidal in shape, as can be seen in FIG. 1, giving interconnected web 40 a shape that can resemble a honeycomb.

A preferred range of angles between any two interconnected web elements (moving radially from the tread portion of the tire to the wheel) can be between 80 and 180 degrees (See, for example, the web elements of FIG. 1). Other ranges are also possible.

With continued reference to the illustrated embodiment of FIGS. 1, 2 and 3, the interconnected web 40 can be arranged such that one web element 42 connects to the generally annular inner ring 20 at any given point or line along the generally annular inner ring 20 such that there are a first set of connections 41 along the generally annular inner ring 20. Likewise, one web element 42 can connect to the generally annular outer ring 30 at any given point or line along an internal surface 33 of the generally annular outer ring 30 such that there are a second set of connections 43 along the generally annular outer ring 30. However, more than one web element 42 can connect to either the generally annular inner ring 20 or to the generally annular outer ring 30 at any given point or line.

In some embodiments, the interconnected web 40 can further comprise intersections between web elements 42 in order to distribute applied load, L, throughout the interconnected web 40. In these embodiments, each intersection can join at least three web elements 42. However, in other embodiments, the intersections 44 can join more than three web elements 42, which can assist in further distributing the stresses and strains experienced by web elements 42.

In some embodiments, the web elements 42 can be angled relative to a radial plane 16 containing the axis of rotation 12 that also passes through web element 42. By angling the web elements 42, applied load, L, which is generally applied perpendicular to the axis of rotation 12, can be eccentrically applied to the web elements 42. This can create a rotational or bending component of an applied load on each web element 42, facilitating buckling of those web elements 42 subjected to a compressive load. Similarly situated web elements 42 can all be angled by about the same amount and in the same direction relative to radial planes 16. In some embodiments, the circumferentially consecutive web elements 42, excluding any tangential web elements, of a layer of plurality of generally polygonal openings 50 are angled by about the same magnitude but measured in opposite directions about radial planes such that web elements 42 are generally mirror images about radial plane 16 of one another.

Each of the openings within the plurality of generally polygonal tubular openings 50 can, but is not required to, be similar in shape. For example, in one embodiment, at least one opening of the first plurality of general polygonal openings 50 can be smaller than at least one opening of a second plurality of generally polygonal openings 50.

The number of openings 50 within the interconnected web 40 can vary. For example, the interconnected web 40 can have five differently sized openings patterned 16 times for a total of 80 cells, such as in FIG. 1. In yet other embodiments, other numbers of openings 50 can be used other than 16. In some embodiments the interconnected web 40 can include between 12-64 patterns of cells. Other numbers outside of this range are also possible.

In some embodiments, openings in a radially inner layer 58 can be similarly shaped as compared to those in a radially outer layer 56 but can be sized differently from those openings such that the generally polygonal openings 50 increase in size when moving from opening to opening in a radially outward direction. In some embodiments, a second plurality of generally polygonal openings 50 in a radially outer layer 56 can also be smaller than those in a first plurality of generally polygonal openings 50 in a radially inner layer 58. In addition, the second plurality of generally polygonal openings can be either circumferentially separated from each other by a third plurality of generally polygonal openings or can be greater in number than the first plurality of generally polygonal openings 50, or it can be both.

FIG. 1 shows a plurality of generally polygonal openings 50 that are generally hexagonally shaped. As shown, these openings can be symmetrical in one direction or in two directions, or, in another embodiment, they can be asymmetrical. For example, in FIG. 1, radial symmetry planes 14 bisect several of the plurality of generally polygonal openings 50. Those openings are generally symmetrical about radial symmetry planes 14. However, interconnected web 40 of tire 10 can also be generally symmetrical as a whole about radial symmetry planes. In comparison, a second plurality of generally polygonal openings 50 can be generally symmetrical about similar radial symmetry planes 14. In addition, in some embodiments a second plurality of generally polygonal openings 50 can be generally symmetrical about lines tangent to a cylinder commonly centered with axis of rotation 12, providing a second degree of symmetry.

The web elements 42 can have significantly varying lengths from one embodiment to another or within the same embodiment. As a result, interconnected web 40 can appear denser in some embodiments, with more web elements 42 and more generally polygonal openings 50 in a given arc of tire 10.

With reference to FIG. 2, the combination of the geometry of interconnected web 40 and the material chosen in interconnected web 40 can enable an applied load, L, to be distributed throughout the web elements 42. Because the web elements 42 are preferably relatively thin and can be made of a material that is relatively weak in compression, those elements 42 that are subjected to compressive forces may have a tendency to buckle. These elements are generally between the applied load, L, that generally passes through axis of rotation 12 and footprint region 32 and are represented as buckled section 48 in FIG. 2.

In one embodiment, some or all of the web elements 42 can be provided with weakened (e.g., previously bent) or thinned sections such that the web elements 42 preferentially bend and/or are biased to bend in a certain direction. For example, in one embodiment, the web elements are biased such that they bend generally in an outwardly direction. In this manner, web elements do not contact or rub against each as they buckle. In addition, the position of the weakened or thinned portion can be used to control the location of the bending or buckling to avoid such contact.

When buckling occurs, the remaining web elements 42 may experience a tensile force. It is these web elements 42 that support the applied load L. Although relatively thin, because web elements 42 can have a high tensile modulus, E, they can have a smaller tendency to deform but instead can help maintain the shape of the tread carrying layer 70. In this manner, the tread carrying layer 70 can support the applied load L on the tire 10 as the applied load L is transmitted by tension through the web elements 42. The tread carrying layer 70, in turn, acts as an arch and provides support. Accordingly, the tread carrying layer 70 is preferably sufficiently stiff to support the web elements 42 that are in tension and supporting the load L. Preferably, a substantial amount of the applied load L is supported by the plurality of web elements working in tension. For example, in one embodiment, at least 75% of the load is supported in tension, in another embodiment at least 85% of the load is supported in tension and in another embodiment at least 95% of the load is supported in tension. In other embodiments, less than 75% of the load can be supported in tension.

Although the generally annular inner ring 20, the generally annular outer ring 30, and the interconnected web 40 can be comprised of the same material, they can all have different thicknesses. That is, the generally annular inner ring can have a first thickness, $t_i$, the generally annular outer ring can have a second thickness, $t_o$, and the interconnected web can have a third thickness, $t_e$. As shown in FIG. 1, in one embodiment, the first thickness $t_i$ can be less than the second thickness $t_o$. However, the third thickness, $t_e$, can be less than either first thickness, $t_i$, or the second thickness, $t_o$. This illustrated arrangement is presently preferred as a thinner web element 42 buckles more easily when subjected to a compressive force whereas a relatively thicker generally annular inner ring 20 and the generally annular outer ring 30 can advantageously help maintain lateral stiffness of non-pneumatic tire 10 in an unbuckled region by better resisting deformation.

The thickness, $t_e$, of web elements 42 can vary, depending on predetermined load capability requirements. For example, as the applied load, L, increases, the web elements 42 can increase in thickness, $t_e$, to provide increased tensile strength, reducing the size of the openings in the plurality of generally polygonal openings 50. However, the thickness, $t_e$, should not increase too much so as to inhibit buckling of those web elements 42 subject to a compressive load. As with choice of material, the thickness, $t_e$, can increase significantly with increases in the applied load L. For example, in certain non-limiting embodiments, each web element 42 of interconnected web 40 can have a thickness, $t_e$ between about 0.04 inch and 0.1 inch thick for tire loads of about 0-1000 lbs, between about 0.1 and 0.25 inch thick for loads of about 500-5000 lbs, and between 0.25 and 0.5 inch thick for loads of about 2000 lbs or greater. Those of skill in the art will recognize that these thicknesses can be decreased or increased in modified embodiments.

In addition to the web elements 42 that are generally angled relative to radial planes 16 passing through axis of rotation 12, the interconnected web 40 can also include tangential web elements, as shown in FIG. 1. The tangential web elements can be oriented such that they are generally aligned with tangents to cylinders or circles centered at axis of rotation 12. In some embodiments the tangential web elements can be preferred because they assist in distributing applied load L. For example, when the applied load L is applied, the web elements 42 in a region above axis of rotation 12 are subjected to a tensile force. Without the tangential web elements, interconnected web 40 may try to deform by having the other web elements 42 straighten out, orienting themselves in a generally radial direction, resulting in stress concentrations in localized areas. However, by being oriented in a generally tangential direction, the tangential web elements can distribute the applied load L throughout the rest of interconnected web 40, thereby minimizing stress concentrations.

With continued reference to FIGS. 1-3, the generally polygonal openings 50 are shown wherein each one of the plurality of generally polygonal openings 50 is radially oriented. As noted above, the generally polygonal openings 50 can be oriented such that they are symmetrical about radial symmetry planes 14 that pass through axis of rotation 12. This arrangement can facilitate installation by allowing tire 10 to still function properly even if it is installed backwards because it should behave in the same manner regardless of its installed orientation.

Figure 4:
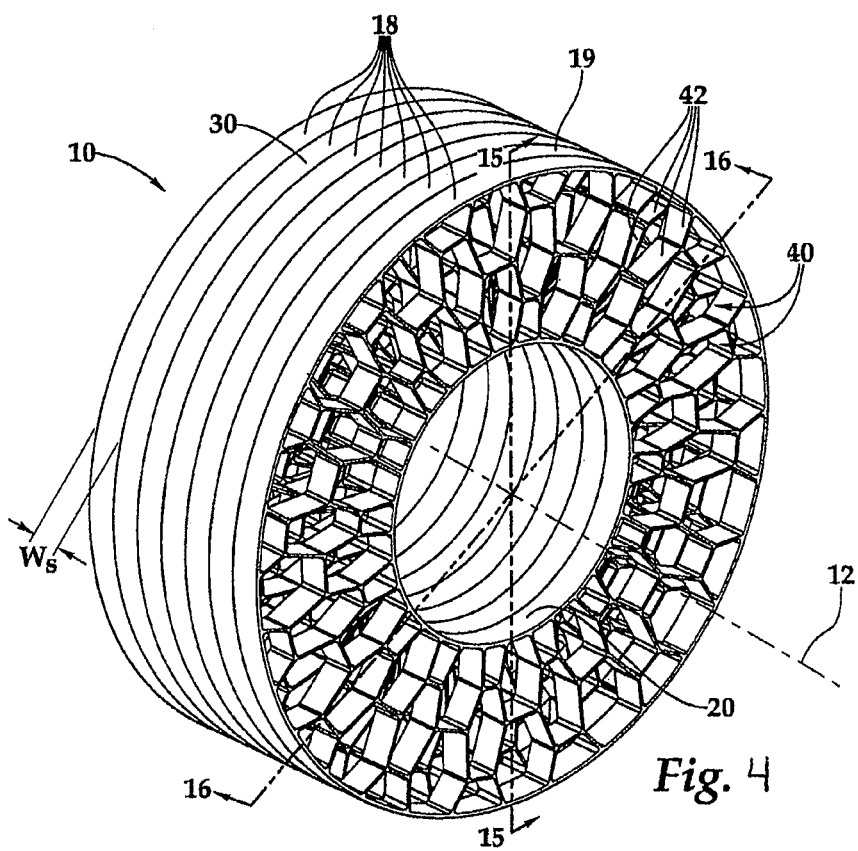
FIG. 4 is a perspective view of an embodiment of an undeformed non-pneumatic tire with circumferentially offset segments.

The interconnected web 40, the generally annular inner ring 20 and the generally annular outer ring 30 can be molded all at once to yield a product that has a width or depth of the finished non-pneumatic tire. However, the interconnected web 40, the generally annular inner ring 20 and the generally annular outer ring 30 can be manufactured in steps and then assembled as seen in the embodiment of FIG. 4. In this figure, each segment 18 has an interconnected web 40 having the same pattern as the non-pneumatic tire 10 of FIG. 1.

For example, FIG. 4 shows a perspective view of an embodiment where the tire 10 comprises a plurality of segments 18. Each segment 18 can have a generally uniform width, $W_S$, but they can also have different widths in modified embodiments. The segments 18 can be made from the same mold so as to yield generally identical interconnected webs 40, but they can also be made from different molds to yield varying patterns of interconnected webs 40. In addition, as seen in FIG. 4, segments 18 can be circumferentially offset from one another so that a plurality of generally polygonal openings 50 of one segment 18 is not generally aligned with a plurality of similarly-shaped generally polygonal openings 50 of a radially adjacent segment 19. The segments can alternate so that every other segment 18 is generally aligned. In another embodiment, the segments do no alternate. FIG. 4 shows an embodiment having seven segments 18, where the first, third, fifth and seventh segments are generally aligned with each other, the second, fourth and six segments are generally aligned with each other, but the two groups of segments are not generally aligned as a whole. In some embodiments, two radially adjacent segments are not generally aligned. This stacking orientation can help with buckling around the footprint region 32, can decrease vibration and noise, and can provide greater torsional stiffness to non-pneumatic tire 10.

As shown in FIG. 1, the generally annular outer ring 30 can have a radially external surface 34 to which a tread carrying layer 70 is attached. With reference to FIGS. 5-9, the tread carrying layer 70 can comprise embedded reinforcing belts 72 to add increased overall stiffness to the non-pneumatic tire 10 wherein the embedding of the reinforcing belts 72 is accomplished according to methods commonly available in the art. Reinforcing belts 72 can be made of steel or other strengthening materials.

FIGS. 5-7 show several possible examples of the arrangement of the reinforcing belts 72 in tread carrying layer 70. FIG. 5 is a version showing a tread 74 at a radial outermost portion of the tire 10. Moving radially inwardly are a plurality of reinforcing belts 72a, a layer of support material 76, which forms a shear layer, and a second plurality of reinforcing belts 72b. In this embodiment, the reinforcing belts 72a, 72b are arranged so that each belt is a generally constant radial distance from axis of rotation 12.

Turning to the embodiment of FIG. 6, a tread carrying layer 70 similar to that of FIG. 5 is shown. However, the embodiment of FIG. 6 shows the layer of support material 76 being approximately bisected in a generally radial direction by at least one transverse reinforcing belt 72c. Support material 76 can be a rubber, polyurethane or similar compound such that as a footprint is formed by the tire, the support material 76 between the reinforcing belts 72 is subjected to a shear force. Thus, the support layer 76 provides the tread carrying layer 70 with increased stiffness.

The tread carrying layer 70 of FIG. 7 resembles that of FIG. 5 but comprises two additional groupings of reinforcing belts 72. In addition to the generally radially constant plurality of reinforcing belts 72a, 72b, the tread carrying layer 70 in FIG. 7 includes transverse reinforcing belts 72d, 72e. The transverse reinforcing belts 72d, 72e include at least one reinforcing belt 72d proximate a longitudinally inner surface and at least one reinforcing belt 72e proximate a longitudinally outer surface, such that reinforcing belts 72a, 72b, 72d, 72e generally enclose layer of support material 76 in a generally rectangular box shape.

The reinforcing belts 72 and the support material 76 as described above generally form a shear layer. As a footprint is formed by the tire, the support material 76 between the reinforcing belts is subjected to a shear force. Thus, the support material 76 provides the tread carrying layer 70 with increased stiffness.

In one embodiment, the shear layer (support material) 76 has a thickness that is in the range from about 0 inches (i.e., no shear layer) to about 1 inch think (as measured along a radius extending from the axis of rotation). In other heavy load applications, the shear layer 76 can have a thickness greater than 1 inch.

The choice of materials used for interconnected web 40 may be an important consideration. In one embodiment, the material that is used will buckle easily in compression, but be capable of supporting the required load in tension. Preferably, the interconnected web 40 is made of a cross-linked or uncross-linked polymer, such as a thermoplastic elastomer, a thermoplastic urethane, or a thermoplastic vulcanizate. More generally, in one embodiment, the interconnected web 40 can preferably be made of a relatively hard material having a durometer measurement of about 80 A-95 A, and in one embodiment 92 A (40 D) with a high tensile modulus, E, of about 21 MPa or about 3050 psi or in other embodiments between about 3000 psi to about 8000 psi. However, tensile modulus can vary significantly for rubber or other elastomeric materials, so this is a very general approximation. In addition, durometer and tensile modulus requirements can vary greatly with load capability requirements.

The polymer materials discussed above for the interconnected web 40, the inner ring 20, and/or the outer ring 30 can additionally include additives configured to enhance the performance of the tire 10. For example, in one embodiment, the polymer materials can include one or more of the following: antioxidants, light stabilizers, plasticizers, acid scavengers, lubricants, polymer processing aids, anti-blocking additives, antistatic additives, antimicrobials, chemical blowing agents, peroxides, colorants, optical brighteners, fillers and reinforcements, nucleating agents, and/or additives for recycling purposes.

Other advantages can be obtained when using a polymer material such as polyurethane to make non-pneumatic tire 10 instead of the rubber of traditional tires. A manufacturer of the illustrated embodiments can only need a fraction of the square footage of work space and capital investment required to make rubber tires. The amount of skilled labor necessary can be significantly less than that of a rubber tire plant. In addition, waste produced by manufacturing components from a polyurethane material can be substantially less than when using rubber. This is also reflected in the comparative cleanliness of polyurethane plants, allowing them to be built in cities without the need for isolation, so shipping costs can be cut down. Furthermore, products made of polyurethane can be more easily recyclable.

Cross-linked and uncross-linked polymers, including polyurethane and other similar non-rubber elastomeric materials can operate at cooler temperatures, resulting in less wear and an extended fatigue life of tire 10. In addition, the choice of materials for interconnected web 40 and outer ring 30 can significantly decrease rolling resistance, leading to about a 10% decrease in fuel consumption. Polyurethane has better abrasion resistance and, therefore, better tread wear than a traditional rubber tire and, unlike rubber, it is inert, making it resistant to oxidization or reaction with other materials that make rubber harden or even crack.

In some embodiments, the interconnected web 40 can comprise web elements 42 that also contain strengthening components such as carbon fibers, KEVLAR®, or some additional strengthening material to provide additional tensile strength to the interconnected web 40. Properties of the strengthening components for certain embodiments can include high strength in tension, low strength in compression, light weight, good fatigue life and an ability to bond to the material comprising interconnected web 40.

Figure 8:
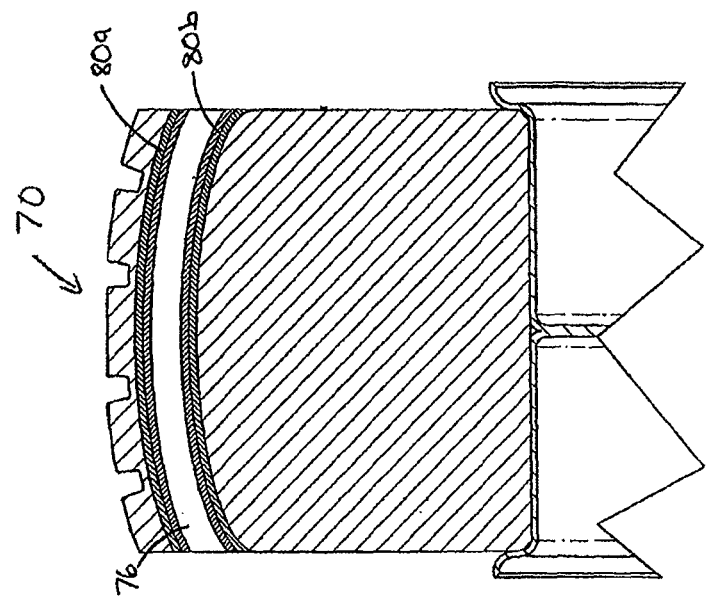
FIG. 8 is a cross sectional view of an embodiment of a tread-carrying layer of a non-pneumatic tire.
Figure 9:
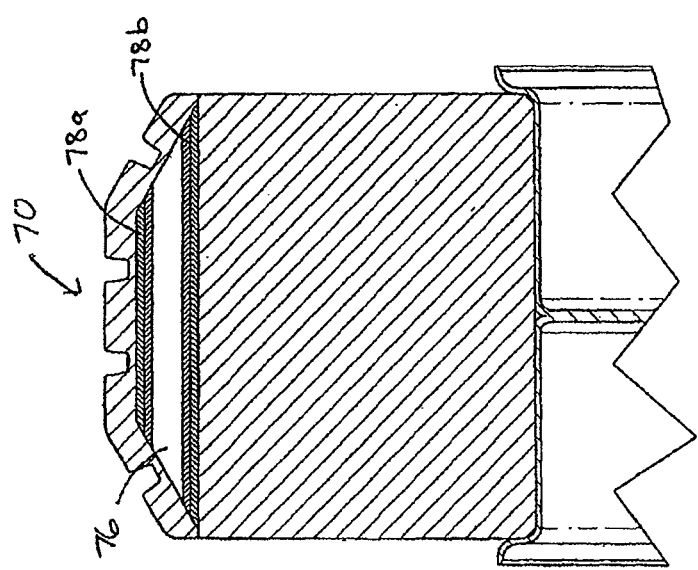
FIG. 9 is a cross sectional view of another embodiment of a tread-carrying layer of a non-pneumatic tire.

With reference to FIGS. 8 and 9, a crowned (FIG. 8) or rounded configuration (FIG. 9) of the components of the tread layer 70 can be utilized to prevent or reduce excessive drag on the edges of the tread layer 70 during steering or cornering of the vehicle. By giving the tread layer 70 a curved or crowned geometry, such as that shown in FIGS. 8 and 9, the tread along the outer edges of the tire will not wear down as quickly, and the life of the tire can be extended.

Thus, for example, and with reference to FIG. 8, in at least one embodiment the tread carrying layer 70 can comprise inner belt layers 78a and 78b. The belt layer 78b can have a larger width than the belt layer 78a, giving the tread carrying layer 70 a generally crowned or rounded shape. A layer of support material 76 can be placed between the belt layers 78a and 78b.

With reference to FIG. 9, in at least another embodiment the tread carrying layer 70 can comprise belt layers 80a and 80b. Both belt layers 80a and 80b can be curved in order to give the tread carrying layer 70 a generally crowned or rounded shape. Again, a layer of support material 76 can be placed between belt layers 80a and 80b.

The tread carrying layers 70 of FIGS. 5-9 described above can be manufactured similar to pneumatic tires. For example, in one embodiment, each layer of the tread carrying layer can be manufactured separately in rolls. The thicknesses of the rolls can vary. In at least one embodiment, some of the rolls can be rubber, while other rolls can comprise a steel belting that is coated in a rubber compound and configured for a particular belt angle for a particular tire. Each of the rolls can be brought to a tire building machine, and wrapped onto the machine in a particular order. The last layer can generally comprise a thick layer of rubber to be used as the exterior tread for the tire.

After wrapping each layer, the entire assembly can be brought to a mold. The outer diameter of the mold can have the reverse pattern of the tread engraved in it. The mold can be heated to a temperature that allows the rubber to easily deform and/or flow. The assembly can be set in the mold, and pressure can be applied from the inside to force the tread against the outer wall of the mold, which converts the thick outer layer into a patterned tread. The assembly can sit within the mold under heat and pressure for a specified period of time, allowing the rubber layers to vulcanize and generally transform from several individual layers into one solid layer.

Once a tread carrying layer has been manufactured as described above, the tread carrying layer 70 can be connected to the interconnected web 40. Various methods can be used. For example, at least one arrangement comprises overmolding the interconnected web 40 directly onto the radially inwardly facing surface of the tread carrying layer 70. An adhesive can be sprayed onto the inside diameter of the tread carrying layer 70 and outside diameter of the tire's wheel 60. In one embodiment, a mold can then be filled with liquid urethane. The adhesive on the tread layer 70 and wheel 60 of the tire 10 can form a bond with the urethane. Once the urethane cures and stiffens, the interconnected web 40 will be molded to both the tread carrying layer 70 and tire wheel 60.

In another embodiment, the interconnected web 40 can first be made separately in its own mold. The outside diameter of the interconnected web 40, or the generally annular outer ring 30, can be formed so that it is slightly larger than the inside diameter of the tread carrying layer 70. An adhesive can be applied to the outside diameter of the interconnected web 40. The interconnected web 40 can then be temporarily compressed so that it can be placed into the tread carrying layer 70. Once the interconnected web is positioned correctly, the compression on the interconnected web 40 can be removed. The interconnected web 40 can then spread out and contact the tread carrying layer 70. This method can reduce the residual tension (caused by shrinking of the web material as it cures) that might occur by molding the interconnected web 40 and attaching it to the tread carrying layer 70 at the same time as discussed above.

Figure 10A:
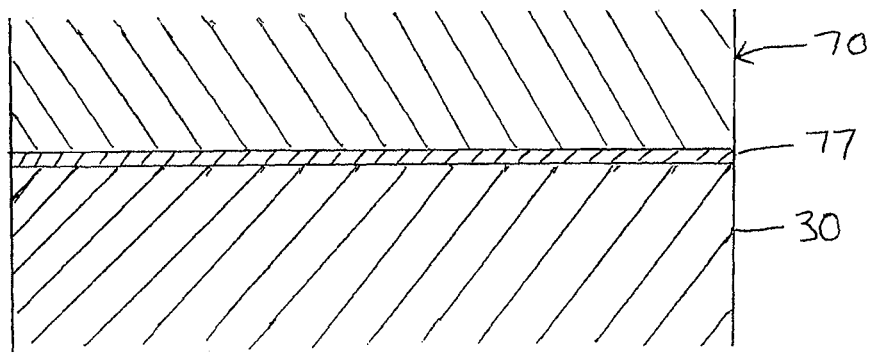
FIG. 10A is a cross sectional view of an embodiment of an outer ring and tread carrying layer bonded together with a layer of fabric.
Figure 10B:
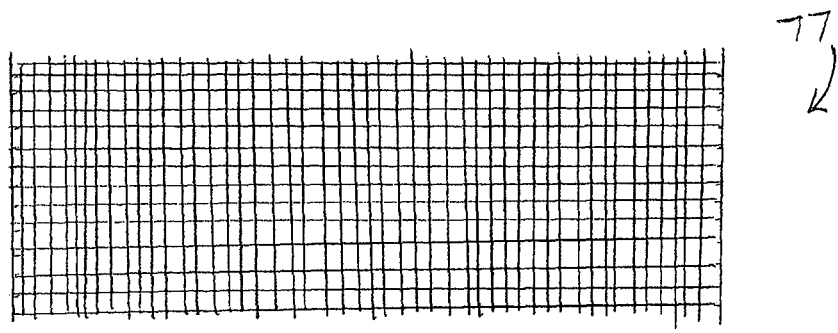
FIG. 10B is a top plan view of the layer of meshed fabric of FIG. 10A.

With reference to FIGS. 10A and 10B, in yet other embodiments the tire 10 can be formed by bonding and/or coupling the generally annular outer ring 30 and/or web 40 to the tread carrying layer 70 with a layer of fabric 77 in between. Traditional adhesives and/or bonding gums, such as for example Loctite® 416, are typically used to help form a tire band and/or hold rubber components to other materials, but these adhesives and/or gums do not always work as well as desired. For example, adhesives often fail to stick to rubber during a cast urethane process. It has been found that fabric, including but not limited to plainwoven or dull-finish linen (i.e. Holland cloth) which can be used as a release agent in a mandrel, adheres to gum rubber as the gum rubber cures. Thus, in a cast urethane process in which urethane is poured to form the web 40 and/or outer ring 30, the plainwoven or dull-finish linen (i.e. Holland cloth) can bond the rubber tread carrying layer 70 of the tire 10 to the urethane web 40 and/or outer ring 30. Use of plainwoven or dull-finish linen (i.e. Holland cloth) fabric as a bonding agent can offer flexural and elevated temperature properties which are advantageous, especially when compared with traditional adhesives.

Other fabrics 77 besides plainwoven or dull-finish linen (i.e. Holland cloth) can also be used. For example, fabrics including but not limited to polyester, cotton duck, polyolefin, RFL, PET, and nylon can act as bonding agents, offering flexural and elevated temperature properties which are advantageous. While fabric can be used to bond rubber and urethane as described above, it can also be used generally to bond any first flowable material to any second flowable material. For example, the fabric layer 77 as shown in FIGS. 10A and 10B can be used to generally bond one polymer to another polymer. In some embodiments, the polymers can be elastomers such as gum rubber. In some embodiments both polymers can be of the same type of material.

In some embodiments, the tread carrying layer 70 can be bonded and/or coupled with the layer of fabric 77 prior to casting of a urethane web 40 and outer ring 30. For example, the layer of fabric 77 can be placed next to and/or attached to the inner diameter of the tread carrying layer 70. The combination of the tread carrying layer 70 and fabric 77 can then be positioned within a urethane mold, and the urethane for the web 40 and/or inner and outer rings 20, 30 can be poured. When the urethane cools, the web 40 and/or generally outer ring 30, layer of fabric 77, and tread carrying layer 70 can be bonded together.

With continued reference to FIG. 10B, the layer of fabric 77 can comprise a thin mesh material. That is, a material with a series regular or non-regular sized and/or positioned openings. In one embodiment, interwoven fiber (natural, synthetic or a combination of both) strands can form the plurality of small openings. As noted above, In some embodiments, these small openings can facilitate bonding of the urethane, or other flowable material, to the tread carrying layer 70. For example, as the urethane and/or rubber cools from a generally liquid form to a solid form during the curing process, portions of both the urethane from the outer ring 30 and/or rubber from the tread carrying layer 70 can become entrapped within the openings of the interwoven material. The layer of fabric 77 can thus act to bind and/or hold polymers together on either side. While in the embodiments described above, a fabric 77 is used in other embodiments other forms of porous or mesh like materials can be used. For example, while a fabric typically comprises fibers or filaments, in some embodiments a mesh type material made of, for example, a plastic can be used. In other embodiments, a porous membrane like material can be used.

Figure 10C:
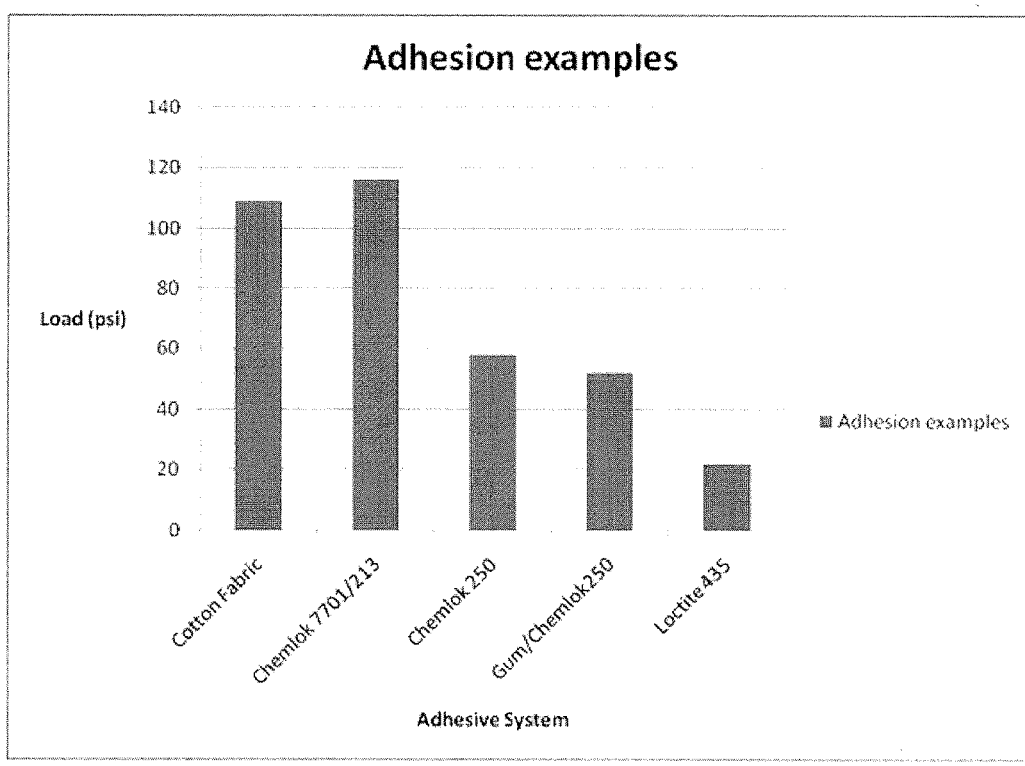
FIG. 10C is a graph illustrating a comparison of tear strengths for different fabrics under different loads.
Figure 10D:
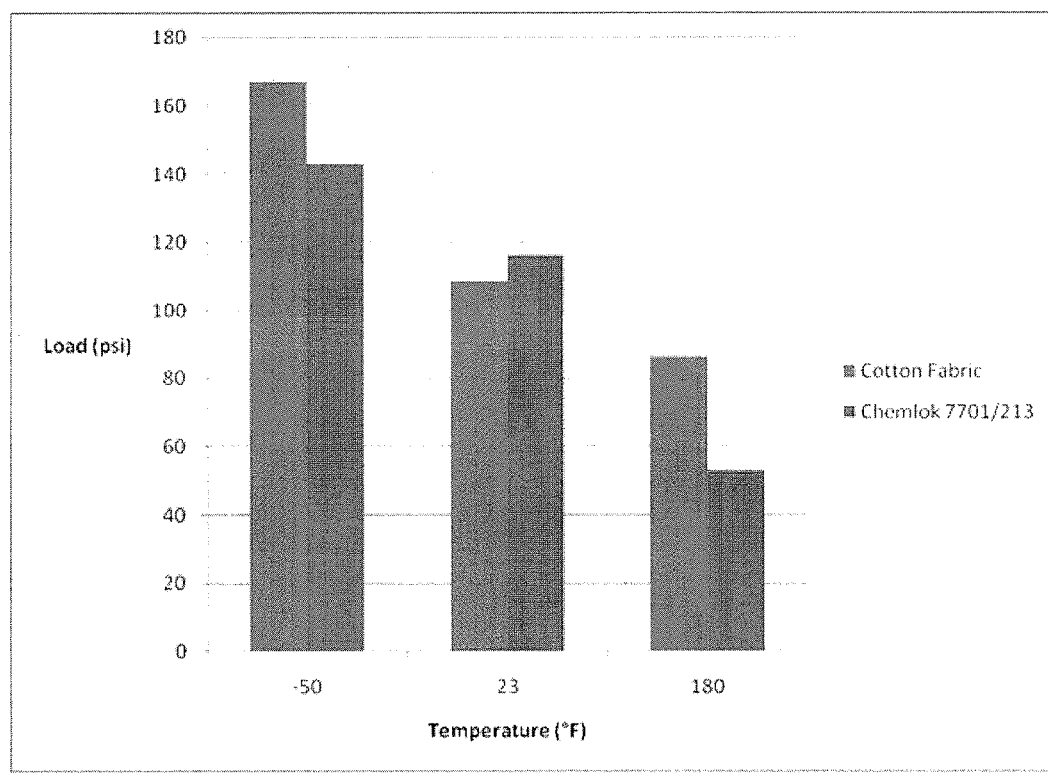
FIG. 10D is a graph illustrating a comparison of tear strengths for different fabrics under different loads and temperatures.

FIGS. 10C and 10D illustrate graphically a comparison of tear strengths for fabric and other adhesion systems. FIG. 10C illustrates a comparison of fabric tear strengths under identical temperature conditions (23 degrees F.). FIG. 10D illustrates a comparison of fabric tear strengths under varying temperature conditions.

With reference to FIG. 10C, the axis labeled "Load" illustrates the load required to pull part of a polymer web from a tread band using cotton fabric as the layer of fabric 77 described above. FIG. 10C further illustrates the load required to pull part of a polymer web from a tread band using four other industrial adhesive systems, Chemlock 7701/213, Chemlock 250, Gum/Chemlock 250, and Loctite 435. As illustrated in the graph, both the cotton and Chemlock 7701/213 can have sufficient adhesion to produce almost 100% rubber tearing, meaning the adhesion was generally stronger than the strength of the tread band rubber.

With reference to FIG. 10D, the axis labeled "Load" again illustrates the load required to pull part of a polymer web from a tread band. Both cotton fabric and Chemlock 7701/213 were tested again, except this time with varying temperature conditions. For example, the cotton fabric and Chemlock 7701/213 were tested under −50 degrees F., 23 degrees F., and 180 degrees F. As illustrated in the graph, the cotton was superior at both −50 degrees F. and 180 degrees F., and the Chemlock 7701/213 produced minimal rubber tearing during 180 degree testing.

While the layer of fabric 77 has been described in the context of connecting an interconnected web 40 and/or outer ring 30, and tread carrying layer 70, it is understood that the concept of binding one flowable material to another flowable material using fabric as a bonding agent can be applied to various other devices and/or systems, including but not limited to automotive components or other types of non-pneumatic tires with tension members. For example, a layer of fabric 77 can be used to connect a web which comprises a plurality of radially extending spokes to a tread carrying layer, as opposed to connecting an interconnected web where the web elements are interconnected to form a plurality of polygonal openings such as shown in FIG. 1. In a tire with radially extending spokes, such as the Tweel™ described above, the spokes can comprise tension members extending from a central portion of the tire. The fabric 77 can be placed and/or attached to the inside diameter of the tread carrying layer of such a tire, so that the web and/or outer ring can be bonded with the tread carrying layer.

In some embodiments, and as described above, the tread carrying layer 70 can comprise more than one type of material and/or layer of material. For example, the tread carrying layer 70 can comprise inner belt layers 78a and 78b, such as shown in FIG. 8. In one embodiment, each layer of the tread carrying layer 70 can be manufactured separately in rolls. Some of the rolls can be rubber, while other rolls can comprise a steel belting that is coated in a rubber compound and configured for a particular belt angle for a particular tire. Each of the rolls can be brought to a tire building machine, and wrapped onto the machine in a particular order. The last layer can generally comprise a thick layer of rubber to be used as the exterior tread for the tire.

Figure 11:
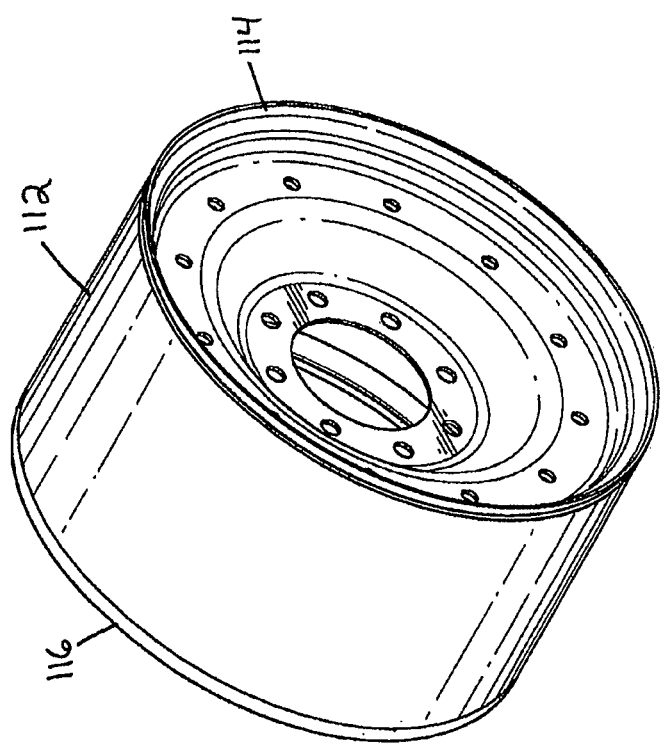
FIG. 11 is a perspective view of an embodiment of a non-pneumatic tire incorporating a cylinder and two wheel components.
Figure 12:
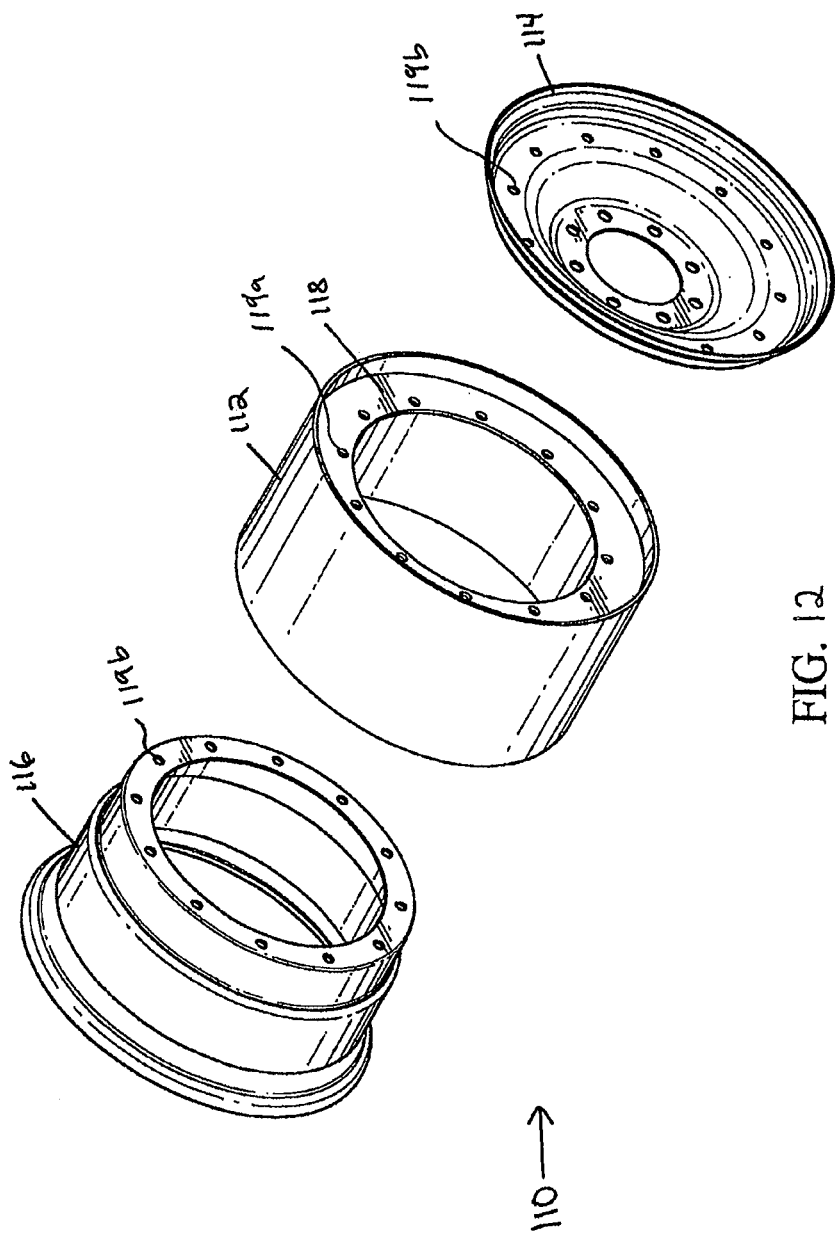
FIG. 12 is an exploded view of the embodiment of FIG. 11.

With reference to FIGS. 11 and 12, and as mentioned above, the tire 10 can be coupled to the wheel 60 of a vehicle. In at least one embodiment, a generally cylindrical component can fasten to the non-pneumatic tire's wheel 60. For example, an embodiment of a non-pneumatic tire 110 can comprise a hollow metal (or other material) cylinder 112 configured for attachment to an existing HMMWV or other vehicle's wheel components 114, 116. The cylinder 112 can include a flanged portion 118 extending towards the interior hollow portion of the cylinder 112. The flange 118 can have holes 119a which align with holes 119b in the wheel components 114, 116, thereby facilitating attachment of the cylinder 112 and wheel 114, 116 by bolts or other fasteners (not shown). While the embodiment shown discloses a flange 118 that extends circumferentially around the interior of the cylinder 112, in other embodiments the flange 118 can extend around only a portion of the interior of the cylinder 112. In yet other embodiments, there can be a plurality of flanges spaced apart around the interior of the cylinder 112.

At least a portion of cylinder 112 can be coupled to the generally annular inner ring 20 as described above. Thus, an interconnected web 40 and a generally annular outer ring 30, such as any of those shown in FIGS. 1-4, can be attached to the exterior, or radially outwardly facing surface, of cylinder 112 via molding, adhesion, or other methods of attachment. The cylinder 112, the interconnected web 40, the inner ring 20, and the generally annular outer ring 30 can then be attached to the wheel 112, 114.

The tire configuration of FIGS. 11 and 12 provides an advantage in tire servicing and replacement. For example, the cylinder 112 and wheel components 114, 116 can easily be removed from one another by removing the bolts or other fasteners. Once the bolts are removed, the tire 10 can quickly be serviced, and/or parts of the tire 10 can quickly and easily be replaced.

Figure 13:
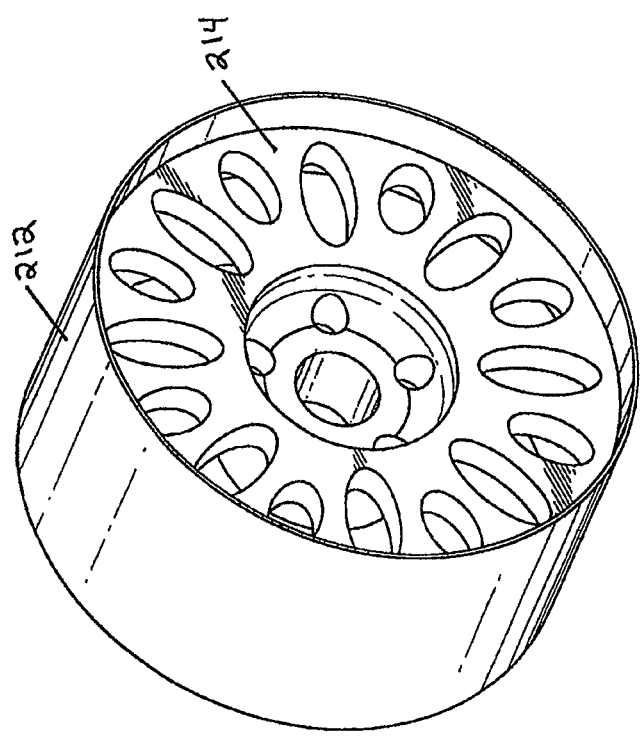
FIG. 13 is a perspective view of an embodiment of a non-pneumatic tire incorporating a cylinder and wheel plate.
Figure 14:
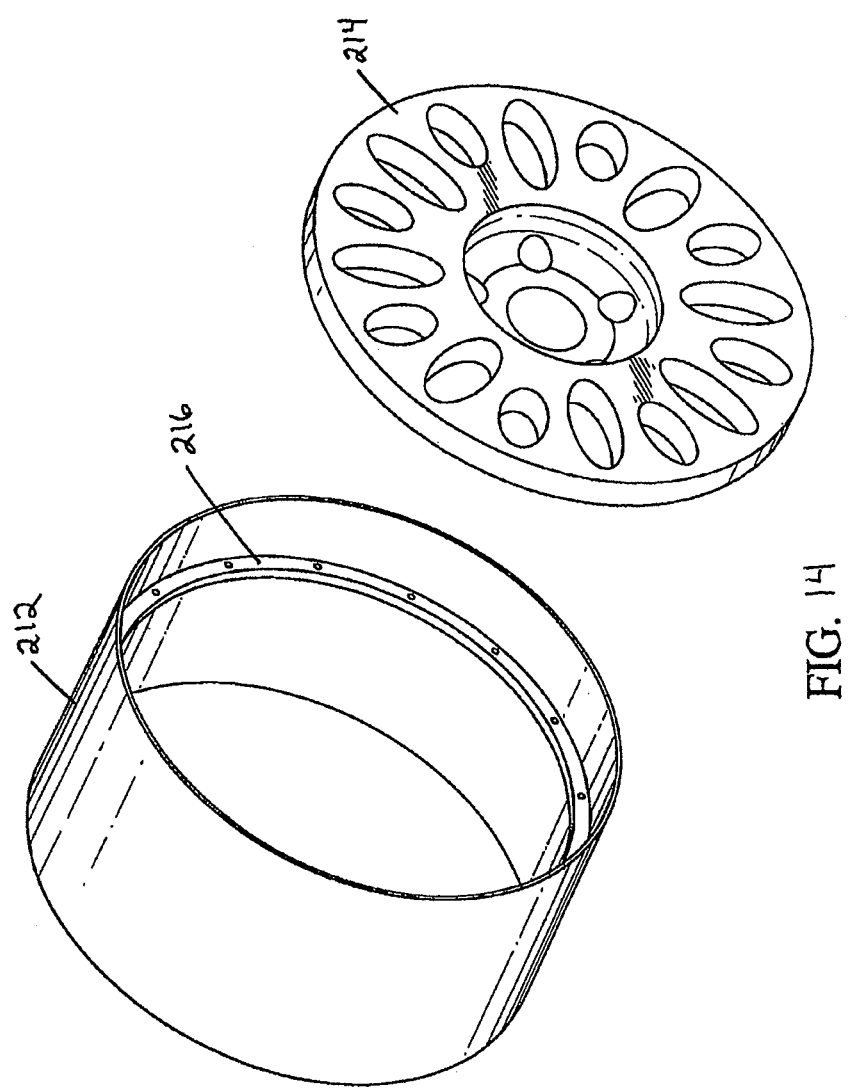
FIG. 14 is an exploded view of the embodiment of FIG. 13.

With reference to FIGS. 13 and 14, another embodiment of a non-pneumatic tire 210 can comprise a metal (or other material) cylinder 212. Cylinder 212, much like cylinder 112 of the preceding embodiment, can include a flange 216 with holes configured for attaching cylinder 212 with wheel plate 214. Just as with cylinder 112, the inner ring 20, the interconnected web 40 and the generally annular outer ring 30, such as any of those shown in FIGS. 1-4, can be attached to the radially outwardly facing surface of cylinder 212 via molding, adhesion, or other methods of attachment. The single metal wheel plate 214 can quickly and easily be removed from the rest of the tire in order to service the tire or replace parts.

In yet another embodiment, the interconnected web and the generally annular outer ring, such as any of those shown in FIGS. 1-4, can be directly attached to an existing wheel rim (not shown) without use of a cylinder such as cylinder 112 or 212. Thus, instead of removing any bolts and replacing or servicing different parts of the tire, the tire can simply be discarded when it has worn down.

Additionally, in yet another embodiment, an interconnected web can be directly engaged by a wheel, tread carrying layer, or both. For example, a wheel and tread carrying layer can either or both comprise dovetail joints. The wheel and tread carrying layer can then be inserted into a mold with the material comprising the interconnected web filling the joints. In this case, the generally radially outwardly facing surfaces of the wheel comprise the generally annular inner surface of the tire, and the generally radially inwardly facing internal surface of the tread carrying layer comprises the generally annular outer ring. Therefore, when the interconnected web sets, the interconnected web is directly engaged, obviating the need to bond or otherwise affix the interconnected web to the generally annular outer ring.

Non-pneumatic tires, including those that use a web as discussed above, can also incorporate the use of a sidewall or some other structure capable of covering and protecting the web and tire. Use of a sidewall helps to ensure that debris, water, or other material does not enter the tire, including an interconnected web area, and interfere with the tire's functionality and performance. The sidewall can also help prevent damage to the web from projectiles or other debris.

Figure 16:
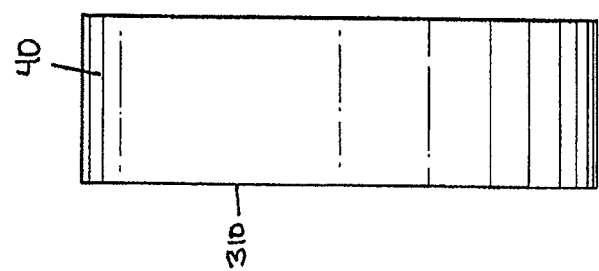
FIG. 16 is a left side view of the sidewall in FIG. 15.
Figure 15:
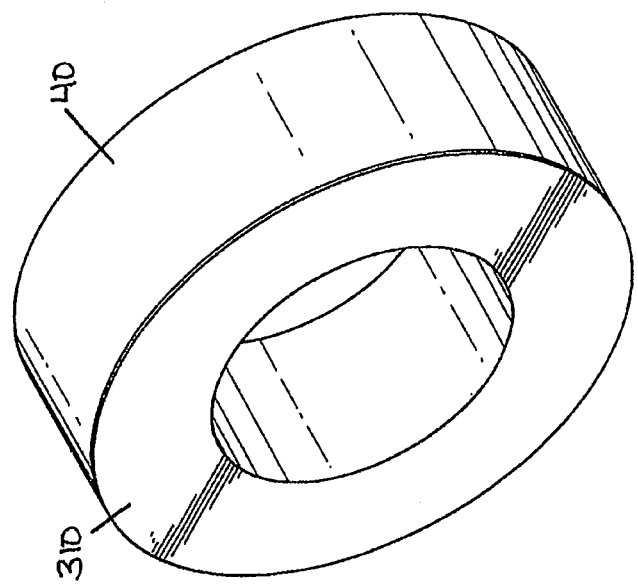
FIG. 15 is a perspective view of an embodiment of a non-pneumatic tire, including a sidewall integrated with the interconnected web.

With reference to FIGS. 15 and 16, a sidewall 310 can be attached to or integrated with an interconnected web 40. In at least one embodiment, the sidewall 310 can be adhered directly to at least one side of the interconnected web 40. The sidewall 310 can be entirely flat when viewed from its side, as illustrated in FIG. 16, such that it can be bonded directly to the edges of each or some of the interconnected web elements 42 exposed along the outside of the tire 10. The sidewall 310 can be manufactured separately as one piece and then adhered to the interconnected web 40, or the sidewall can be integrated directly into the interconnected web's molding during production of the web 40.

With continued reference to FIGS. 15 and 16, the sidewall 310 can cover all, or only a portion of, the side of the interconnected web 40. By attaching or integrating a sidewall 310 onto at least a portion of the interconnected web 40, debris or other material can be prevented from entering the interconnected web area of the tire 10 and interfering with the web elements 42.

The sidewall 310 can be made from the same material as that of the interconnected web 40, or the material can be different, such as rubber. In some embodiments, the material for both the interconnected web 40 and sidewall 310 is cast polyurethane. Additionally, in some embodiments the sidewall 310 can have a lower stiffness than that of the interconnected web elements 42. By having a lower stiffness, the sidewall 310 as illustrated in FIGS. 15 and 16 will generally not support any of the loads acting on the tire 10. Instead, the sidewall 310 can bend or flex during loading in the areas between the interconnected web elements 42, allowing the interconnected web elements 42 to continue supporting the loads acting on the tire 10. In other embodiments, the sidewall 310 can support a load.

In an additional embodiment, and with continued reference to FIGS. 15 and 16, the sidewall 310 can be adhered to or integrated with the interconnected web 40 only near the generally annular inner ring 20 and the generally annular outer ring 30. In such embodiments, the sidewall 310 is not adhered to or integrated with some of the interconnected web elements 42 located between the generally annular inner ring 20 and generally annular outer surface 30. This allows sidewall 310 the freedom to flex and bend in the region between the generally annular inner 20 and the generally annular outer rings 30, instead of only in those areas between the interconnected web elements 42.

Figure 18:
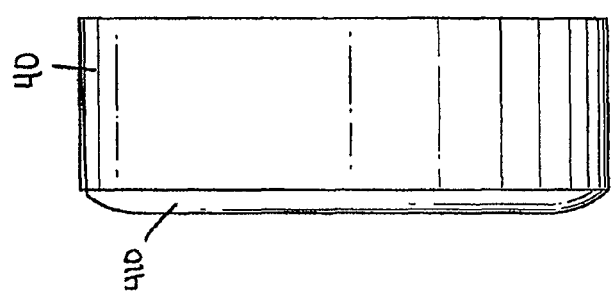
FIG. 18 is a left side view of the sidewall in FIG. 17.
Figure 17:
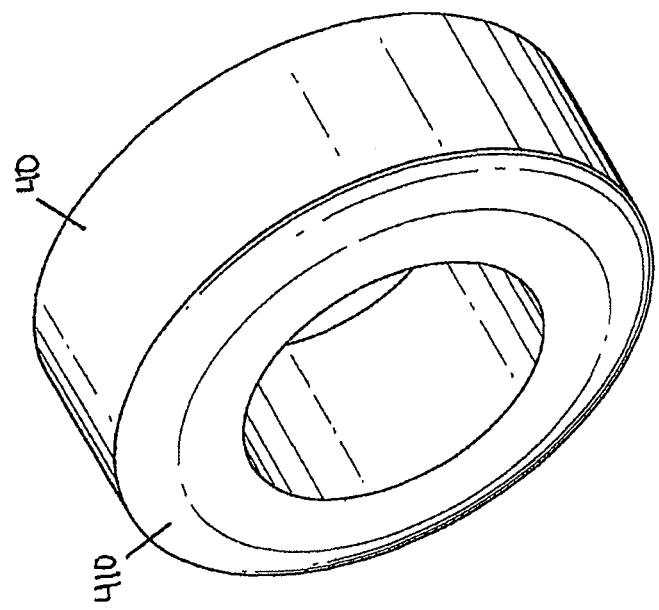
FIG. 17 is a perspective view of an embodiment of a non-pneumatic tire, including a sidewall integrated with the interconnected web.

With reference to FIGS. 17 and 18, an additional embodiment of a sidewall 410 can have a generally "domed" or flexed shape, as opposed to the flat shape of sidewall 410 as shown in FIG. 16. In this embodiment, the sidewall 410 can be adhered to or integrated with the interconnected web 40 as discussed above both the generally annular inner ring 20 and the generally annular outer ring 30. The "domed" shape of the sidewall 410, as illustrated in FIG. 18, biases the sidewall 410 to deform in a prescribed direction (i.e. away from the web 40), as opposed to buckling or deforming in towards the web 40 and interconnected web elements 42. Just as with the previous embodiments, the sidewall 410 and interconnected web 40 can be made of the same material, or different materials. In some embodiments, the interconnected web material 40 is cast polyurethane, and the sidewall 410 rubber.

In yet additional embodiments, the sidewalls 310, 410 described above can be made separate from the interconnected web, and be removable from the tire for servicing and/or replacement. For example, the sidewall 310, 410 can be held in place adjacent the interconnected web 40 by a flange or flanges encircling the tire 10. The flanges (not shown) can be made from material having low stiffness so as to prevent the flanges from interfering with the functionality and performance of the interconnected web elements 42. The flanges can be adhered to or integrated with the interconnected web 40 or other portions of the tire 10. In at least some embodiments, the sidewall can slide out from the grip of the flanges. In yet other embodiments, the flanges can bend or flex, allowing the sidewall to be inserted or removed. In yet other embodiments, the sidewall can be flexible enough to bend and to be inserted into the stationary flanges.

In yet additional embodiments, instead of an actual wall along the side(s) of the interconnected web 40, the interconnected web 40 can be filled partially or wholly with filler, for example, a foam material. In at least one embodiment, the foam can comprise polyurethane foam. By filling the interconnected web 40 with foam or similar material, debris can be prevented from entering the areas between the interconnected web elements 42, which can substantially interfere with the tire's functionality and performance. At the same time, the foam can be flexible. Thus, the foam itself generally will not support any loads on the tire, instead allowing the tire's interconnected web elements to continue supporting the loads. In addition, in other modified embodiments, the filler can be used to support some of the load. As mentioned above, non-foam materials can also be used.

In yet additional embodiments, non-pneumatic tires can incorporate sidewalls similar to pneumatic tires. The sidewalls can be vulcanized to the tread portion of the generally annular outer ring and additionally mounted to the rim of the wheel after the interconnected web has been formed.

Sidewall thicknesses can vary, depending on factors including, but not limited to, the expected applied loads the tire will experience during use, as well as material strength and flexibility. For example, in at least one embodiment, a sidewall comprised of rubber can have a thickness of approximately 0.09375". In at least some embodiments, the thickness of the sidewall can also vary across each individual sidewall.

Advantageously, the embodiments of a non-pneumatic tire described above exhibit many of the same performance characteristics as traditional pneumatic tires. For example, the non-pneumatic tire can demonstrate a general ride quality and traction similar to current pneumatic tires. The non-pneumatic tire 10 can also have costs, weight, load supporting capability and tread life similar to current pneumatic tires.

However, the non-pneumatic tires of the embodiments described herein demonstrate several advantages over standard pneumatic tires. For example, in addition to virtually eliminating blowouts and flat tires, the ability of the generally annular outer ring 30 and the interconnected web 40 to deform in an area around footprint region 32 as shown in FIG. 2 reduces the stresses placed on wheel 60 when hitting a bump, pothole, or similar obstacle, thereby making non-pneumatic tire 10 and wheel 60 less susceptible to damage. Without relying on air pressure to maintain its functionality, interconnected web 40 of non-pneumatic tire 10 can also be better able to withstand damage caused by projectiles. If a portion of interconnected web 40 is damaged, the applied load L, which is generally applied perpendicular to axis of rotation 12, can be transferred to the remaining elements so that a vehicle relying on non-pneumatic tires 10 is not immediately disabled. In addition, because non-pneumatic tire 10 cannot be over- or under-inflated, footprint region 32 can remain generally constant, improving fuel efficiency as compared to traditional pneumatic tires.

The generally annular outer ring 30 combined with interconnected web 40 can display higher lateral stiffness compared to standard pneumatic tires, especially in the embodiment in which the tread carrying layer 70 is attached. Therefore, while general ride quality can be similar to standard pneumatic tires, non-pneumatic tire 10 can achieve improved cornering ability. The non-pneumatic tire 10 can also require less maintenance by obviating the need to check and maintain air pressure.

Additionally, a major advantage of using a non-pneumatic tire compared to a standard tire is eliminating flat tires. If a portion of the web is compromised, the load will be redistributed through other elements of the web by virtue of the fact that the web is interconnected, prolonging the life of the tire. In addition, by not carrying any significant load along a footprint region where the tire contacts a surface, a smoother ride results since the non-pneumatic tire is less susceptible to shock and vibration.

Besides its benefits over traditional pneumatic tires, non-pneumatic tire 10 can exhibit multiple advantages over other non-pneumatic tires. Most of these other tires have solid rim and a solid tire section and are in production for low-speed applications. In comparison to these tires, the non-pneumatic tire 10 can be significantly lighter. The interconnected web 40 can allow non-pneumatic tire 10 to absorb impacts significantly better, resulting in a more comfortable ride. In addition, other non-pneumatic tires are not usable at high speeds due to the amount of vibration that is generated. Some conventional non-pneumatic tires work by placing the portion of the tire that is between the applied load L and the contact surface in compression. This causes that section of the tire and its internal structure to deform under the load. When the body to which the tire is attached is not in motion, this portion of the tire remains deformed under the static load. Over time, this can lead to semi-permanent deformation of the tire causing decreased performance, increased noise vibration and worse fuel efficiency, among other things. In contrast, buckled section 48 carries very little, if any, load so the tire can remain statically deformed for a while and not experience any appreciable semi-permanent deformation.

In comparison to other tension-based non-pneumatic tires, tire 10 can demonstrate even further benefits. Non-pneumatic tire 10 can experience smaller stresses and strains under loading conditions than other tension-based non-pneumatic tires. By allowing air to flow through the tire 10 and around web elements 42, the design of interconnected web 40 can result in less heat generation as well as less fatigue, prolonging the life of tire 10. The ability of interconnected web 40 to buckle around footprint region 32, thereby causing less reactive force when passing over an obstacle, can also result in less vibration and a better ride. Despite the ability of interconnected web 40 to buckle, it can also be relatively stiff when compared to the internal structure of other tension-based non-pneumatic tires. This can result in less noise being generated, resulting in a quieter ride. It can also cause non-pneumatic tire 10 to experience better starting and stopping performance.

Example

In one non-limiting example embodiment, a non-pneumatic tire 10 possesses the interconnected web 40 of the configuration shown in FIGS. 1 and 2. Tire 10 has a radius of about 9.5 inches and wheel 60 has a radius of about 4⅜ inches.

In general, the force required for buckling of a column is governed by the equation: $F\_buckling = (KEI\pi^2)/l^2$ where K=a constant whose value depends on how the ends of the column are affixed, E=tensile modulus, I=the area moment of inertia, and l=the unsupported length of the column.

If each web element 42 of interconnected web 40 is modeled as its own thin column, the radially innermost elements will be fixed at one end and free to move laterally at another end. In this example, K=¼

In this example, the interconnected web 40 and the generally annular outer ring 30 are made of a similar material having a tensile modulus, E, of about 21 MPa or 3050 psi.

Tire 10 can be about 8 inches wide. As noted above, in preferred embodiments, each web element 42 of interconnected web 40 can be between about 0.04 inch and 0.1 inch thick for tire loads of about 0-1000 lbs, between about 0.1 and 0.25 inch thick for loads of about 500-5000 lbs, and between 0.25 and 0.5 inch thick for loads of about 2000 lbs or greater. A thickness of about 0.08 inch will be used for this example. In this case, the area moment of inertia, $I=(w*h^3)/12$ where w=the width of each web element 42, 8 inches and h=the thickness, 0.08 inch. Therefore, I is about 0.000341 in^4.

Using the tire and wheel radii mentioned above, and observing the pattern of interconnected web 40 as seen in FIGS. 1 and 2, each web element 42 can have an approximate length of about (9.5"−4.375")/4, or approximately 1.28 inch.

Based on these numbers, $F\_buckling=(KEI\pi^2)/l^2$=about 1.59 lbs. In addition, web elements 42 of interconnected web 40 are angled with respect to a radial direction to facilitate buckling, which can further decrease F_buckling.

In this application, non-pneumatic tire 10 is subjected to a load, L, of about 250 lbs. Load, L, is distributed throughout web elements 42 such that the entire load, L, is not borne by a single web element, 42. However, the web elements 42 most directly aligned with the direction of load, L, should bear the greatest portion of the load. Since L is significantly larger than F_buckling, elements 42 of interconnected web 40 that are subjected to a compressive force will buckle and not support load, L.

While the foregoing written description of embodiments of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiment and method, but by all embodiments and methods within the scope and spirit of the invention as claimed.

What is claimed is:

1. A non-pneumatic tire for supporting a load comprising:
a generally annular inner ring having an axis of rotation;
a deformable generally annular outer ring comprising a first flowable material and having a radially innermost surface and a radially outermost surface;
a flexible web extending between the inner and the outer ring, the web comprising tension members coupled to the radially innermost surface of the outer ring;
a cured tread carrying layer comprised of a second flowable material and having a radially innermost surface and a radially outermost surface, the radially innermost surface of the tread carrying layer extending continuously in a circumferential direction of the tire; and
a layer of fabric material having a radially innermost surface coupled to the radially outermost surface of the outer ring and a radially outermost surface coupled to the radially innermost surface of the cured tread carrying layer, wherein the layer of fabric material secures the first flowable material to the second flowable material of the cured tread carrying layer.

2. The non-pneumatic tire of claim 1, wherein the layer of fabric material comprises a porous structure.

3. The non-pneumatic tire of claim 1, wherein the layer of fabric material is one of a group consisting of polyolefin, nylon, polyester, cotton duck, and plainwoven or dull-finish linen.

4. The non-pneumatic tire of claim 1, wherein the first flowable material is urethane.

5. The non-pneumatic tire of claim 1, wherein the second flowable material is rubber.

6. The non-pneumatic tire according to claim 1, wherein the layer of fabric material is comprised of a material other than the first and second flowable materials.

7. The non-pneumatic tire according to claim 1, wherein a cross-section of the tread carrying layer taken along a plane extending radially from the tire's center has a rounded shape.

8. The non-pneumatic tire according to claim 1, wherein a cross-section of the tread carrying layer taken along a plane extending radially from the tire's center has a crowned shape.

9. The non-pneumatic tire of claim 1, wherein the web comprises an interconnected web comprising as least two radially adjacent layers of web elements at every radial cross-section of the tire, the web elements defining a plurality of generally polygonal openings.

10. The non-pneumatic tire of claim 9, wherein the plurality of generally polygonal openings comprises a first plurality of generally polygonal openings having a first shape and a second plurality of generally polygonal openings having a second shape different from said first shape.

11. The non-pneumatic tire according to claim 10, wherein at least one of the first plurality of generally polygonal openings and at least one of the second plurality of generally polygonal openings are traversed when moving in any radially outward direction from the axis of rotation.

12. The non-pneumatic tire according to claim 1, wherein the web defines a plurality of openings circumferentially spaced around the tire and radially spaced at varying distances from the axis of rotation, so as to support a load by working in tension.

13. The non-pneumatic tire according to claim 1, wherein the web comprises a plurality of web spokes extending between the inner and outer rings.

14. The non-pneumatic tire according to claim 1, wherein the inner ring is adhesively engaged with the wheel.

15. The non-pneumatic tire according to claim 1, wherein the inner ring is chemically bonded to the wheel.

16. The non-pneumatic tire according to claim 1, wherein the radially innermost surface of the tread carrying layer extends continuously across a centerline of the tire in a direction of the axis of rotation.

17. The non-pneumatic tire according to claim 1, wherein the radially outermost surface of the layer of fabric material is positioned lower than the radially innermost surface of the tread carrying layer.

18. The non-pneumatic tire according to claim 1, wherein the radially outermost surface of the layer of fabric material is positioned radially inward from the radially innermost surface of the tread carrying layer.

19. The non-pneumatic tire according to claim 10, wherein each of said first plurality of generally polygonal openings has a first inner boundary spaced at a first radial distance and each of said second plurality of generally polygonal openings has a second inner boundary spaced at a second, greater radial distance.

20. The non-pneumatic tire according to claim 19, wherein at least one generally polygonal opening of said first plurality of generally polygonal openings is larger than at least one generally polygonal opening of said second plurality of generally polygonal openings.

* * * * *